(12) United States Patent
Verkasalo et al.

(10) Patent No.: US 9,471,912 B2
(45) Date of Patent: Oct. 18, 2016

(54) BEHAVIORAL EVENT MEASUREMENT SYSTEM AND RELATED METHOD

(71) Applicant: Verto Analytics Oy, Espoo (FI)

(72) Inventors: Hannu Verkasalo, Engelberg (CH); Subhradeep Kayal, Espoo (FI); Matias Kontturi, Espoo (FI); Eric Malmi, Espoo (FI)

(73) Assignee: VERTO ANALYTICS OY, Espoo (FI)

( * ) Notice: Subject to any disclaimer, the term of this patent is extended or adjusted under 35 U.S.C. 154(b) by 253 days.

(21) Appl. No.: 14/173,970

(22) Filed: Feb. 6, 2014

(65) Prior Publication Data

US 2015/0220814 A1    Aug. 6, 2015

(51) Int. Cl.
*G06K 9/00* (2006.01)
*G06Q 20/32* (2012.01)
*G06Q 30/02* (2012.01)

(52) U.S. Cl.
CPC ......... *G06Q 20/322* (2013.01); *G06K 9/00671* (2013.01); *G06K 9/00771* (2013.01); *G06Q 20/3255* (2013.01); *G06Q 30/0201* (2013.01); *G06Q 30/0241* (2013.01)

(58) Field of Classification Search
None
See application file for complete search history.

(56) References Cited

U.S. PATENT DOCUMENTS

| | | |
|---|---|---|
| 2011/0161163 A1 | 6/2011 | Carlson et al. |
| 2012/0212484 A1 | 8/2012 | Haddick et al. |
| 2013/0014136 A1 | 1/2013 | Bhatia et al. |
| 2013/0212606 A1 | 8/2013 | Kannan et al. |

OTHER PUBLICATIONS

International Search Report, dated Apr. 22, 2015, in International Application No. PCT/FI2014/051003.

*Primary Examiner* — Siamak Harandi
*Assistant Examiner* — Amandeep Saini
(74) *Attorney, Agent, or Firm* — Young & Thompson

(57) ABSTRACT

Electronic system for obtaining data, via one or more digital devices, on user behavior, digital transactions, and exposure relative to digital content and services, or external exposure and associated events between the user and the environment via sensors attached to digital devices, the system being configured to collect data reflecting the content and objects that the user at least potentially perceives as rendered on one or more digital screens attached to smart devices, reconstruct the at least potentially perceived visual landscape based on the collected data, and determine the target and/or level of user attention in view of the reconstruction and associated exposure events detected therein, and to apply locally stored information about rules or fingerprints in the digital object recognition process involving the collected data and validation of the type or identity of user actions, digital content, or external objects, as reflected by the reconstruction recapturing the visual landscape.

22 Claims, 15 Drawing Sheets

BEHAVIORAL EVENT MEASUREMENT SYSTEM AND RELATED METHOD

FIELD OF THE INVENTION

Generally the invention pertains to digital devices, communications, and monitoring of the use context in which users carry these devices in their daily lives and are exposed to content either arising from within the device or externally regarding e.g. outdoor advertising. In particular, however not exclusively, the present invention concerns sampling and collection of image captures with a wireless device or attached wearable technologies, the deliverables of image capturing representing either content on the screen or external objects as when captured through e.g. digital goggles or other wearable technologies and associated cameras or, more broadly, imaging technologies.

BACKGROUND

Today's consumers have increasingly adopted new digital devices, like smartphones, tablets, smart watches, digital goggles, not forgetting other smart devices and wearable technologies. Many if not most of these devices are beginning to have features like a capability to run complex data processing and statistical activities and to execute more serious number crunching. Also, the devices may incorporate technologies to facilitate the capturing of samples of screen content into an image, as well as various imaging and sound capturing technologies like digital cameras and microphones, respectively. Such features and technologies are to a large extent provided in today's wireless devices, including smartphones, tablets, and phablets. Also, the next generation devices like smart watches, digital headsets, digital goggles, and other wearable technologies, have these same features included. Some of these wearable devices connect to the Internet through so-called master devices, such as a smartphone, and can even use the processing power of the master device. Nevertheless, the systems combining one or many smart devices and digital capturing technologies are becoming more and more popular.

Further, regarding transactions and payments with digital devices, they are becoming an important source of revenue to a vast number of players in the field of e-commerce and gaming industry, for instance. The use of computers and smart wireless devices to complete such transactions is on increase. The related procedures also involve a set of steps and actions with the user interfaces either on the smart devices or through wearable technologies.

Indeed, people use an increasing number of technical means to consume content and access digital services with their smart devices today. Traditionally e.g. most of the Internet usage was about web browsing and visiting certain sites. Nowadays people play with native apps, HTML5 based widgets, different kinds of notification and pop-up based wizards, augmented reality apps with real-time camera image showing in the background, or a set of textual or notification based dialogs projected to e.g. smart watches or digital goggles to mention few examples. The identification of such events cannot be based anymore on simple actions like tracing traffic between the device and Internet, such as various methods based on measuring the event of a site visit or page load into the device.

Besides on-device activities, people are obviously exposed to media events outside their smart and digital devices. What these activities are and do people provide any attention to them/how they potentially react to them, is not a trivial information retrieval and analysis problem to solve.

SUMMARY

The objective of the present invention is to at least alleviate prior art problems and overcome many of the challenges regarding the monitoring and analysis of behavioral events and user exposure arising from the usage of digital devices and activities in the physical world, i.e. environment, as perceived by the users via or at least in parallel with the devices.

In one aspect, there is provided an electronic system for obtaining data, via one or more digital devices, on user behavior, digital transactions, and exposure relative to digital content and services, or on external exposure and associated events between the user and the environment through the use of a number of sensors, optionally wearable technologies, the system being configured to collect data reflecting the content and objects that the user at least potentially perceives as rendered on one or more digital screens attached to the devices, through associated digital projections or characteristics specific to digital content or objects, or in the environment, reconstruct the at least potentially perceived visual landscape based on the collected data, and determine the target and/or level of user attention in view of the reconstruction and associated exposure events detected therein, wherein the system, such as is configured to apply locally stored information about rules or fingerprints in the digital object recognition process involving the collected data and validation of the type or identity of user actions, digital content, or external objects, as reflected by the reconstruction recapturing the visual landscape.

In another aspect, a method for obtaining data, via one or more digital devices, on user behavior, digital transactions, and exposure relative to digital content and services, or on external exposure and associated events between the user and the environment through the use of a number of sensors, optionally wearable technologies, comprises collecting data reflecting the content and objects that the user at least potentially perceives as rendered on one or more digital screens attached to smart devices, through associated digital projections or characteristics specific to digital content or objects, or in the environment, reconstructing the at least potentially perceived visual landscape based on the collected data, and determining the target and/or level of user attention in view of the reconstruction and associated exposure events detected therein, wherein information stored locally at said one or more devices about rules or fingerprints is applied in the digital object recognition process involving the collected data and validation of the type or identity of user actions, digital content, or external objects, as reflected by the reconstruction recapturing the visual landscape.

In a further aspect, a computer program product on a non-transitory carrier medium comprises instructions causing the computer to execute the above method items is provided. The carrier medium may comprise e.g. a memory card, optical disc, or a magnetic storage media.

Regarding the many utilities that the different embodiments of the present invention may offer, one obviously advantageous feature resides in the capability to recognize and interpret the events of media exposure, the content and target of such exposure, its duration and even other characteristics as experienced by the user. The present invention thus provides one key enabler for next generation digital end-user services and augmented reality applications, or media research purposes. To consider a further example of the versatility of the solution, even if the user of the digital device was not interacting with the device or inspecting the screen events, the suggested solution may be configured to utilize sensor(s) available such as camera(s) to determine the user exposure and/or attention. The sensors may be integrated with data collecting/processing devices or be at least functionally connected thereto.

In more detail, the embodiments of the present invention offers a technically feasible solution for collecting and validating e.g. visual data on user initiated actions with digital devices, recognizing contextual factors (e.g. is the user outside or inside, i.e. the user's relative and/or absolute location context), and even recognizing and keeping track of various external objects and events like the fact that the user saw or provided attention to a piece of an outdoor advertising for a duration of 4 seconds in a given location. The forthcoming examples describe valid additional use cases of the present invention.

First, it may be tracked and analyzed how people execute and complete transactions, like payments or purchases, or other similar events on their digital devices. Visual information about such events can be collected and eventually the type and content of such activities can be retrieved and interpreted.

Second, exposure to digital content and the duration thereof may be measured. The monitored activity may be happening through the interaction between the user and the device, or at least in a manner detectable by the on-board or functionally connected sensor(s). Such activities may include the use of a mobile application, visit to a web site with any digital device, exposure to or use of a widget or notification type of a service or content on a smartphone home screen, or on a screen of e.g. a digital goggles type of an external but functionally connected device, or on a smart watch device attached to the user's wrist, for instance.

The suggested solution may be configured to retrieve visual traces of the exposed content and services together with control information about the content (e.g. whether the user attention is targeted to such events and whether the content is technically visible to the user) to track the true exposure to today's services and content. Key characteristics and visual information about the physical screen or projected overlays of wearable devices may be captured and used to recognize such activities of the user.

And as already alluded above, the present invention may be harnessed to track exposure to content, objects, events and media external to the user. Solid example could incorporate monitoring the exposure to outdoor advertising, using e.g. the camera of the digital goggles worn by the user to capture such an event and further exploit the processing power of the smart digital device in the process.

Tracking of media events or exposure/attention to any activity outside the digital device itself may thus be generally executed using e.g. cameras attached to smart watches and digital goggles and sampling the data in a novel way. Image recognition technology may be applied to derive valuable information on the identity and type of objects users are exposed to in the environment (external physical world). The system may keep track of how many users, and for how long, are exposed to selected types of outdoor advertising or even certain advertisements identified, for example.

Fourth, the present invention may be configured to interpret contextual conditions, such as the attention or status of the user (using e.g. available information captured on the interaction between the user and digital devices including the use of touch interfaces, position and movements of eyes, and/or generic physical conditions like heart rate or body/skin temperature measured) or level of ambient light, noise, temperature, location data and acceleration or speed based data points, to determine what the user is doing or generally what is his/her or the carried digital device's context.

Contextual conditions, or "variables", are relevant as they, among other uses, characterize the type of exposure or user activity having regard to content, services or external objects. User attention may be monitored on a plurality of different levels, optionally simultaneously. One task may imply determining where the user attention is, or is there any attention at all, and to overlay this data with the type of exposure or logged digital actions, to validate if the user actually did such actions intentionally, and to separate this from noise and non-user initiated, potentially accidental or otherwise erroneous, actions. Yet, the applied contextual logic may be configured to derive information about the context of user behavior or exposure, such as if the said activity happened in an augmented overlay environment, whether and advertisement was seen in dark or light context, whether there were multiple or only one (screen) windows full of content visible to the user when a said activity was observed, and so on.

As a conclusion, a wide spectrum of end-user facing services and applications may be built on top of the provided by the present invention. As a further example, a next generation augmented reality (AR) application can be offered to the users, which recognizes when the users are potentially exposed to a particular type of external object (e.g. a special retail store) and optionally notify the user if there is information such as a special discount in that store currently available, matching information about the user profile. Another example is an app that is able to track what kind of content and services people use, and for how long, on smart watches, digital goggles or e.g. smartphones regardless of the service's technical delivery, and with these data accurate recommendations may be provided regarding some other applications and services that might be of special interest or value to the concerned users.

The present invention also finds many uses in connection with media tracking applications. Congruent with the objectives of the media research industry, the system suggested may be arranged to collect information from a sample (or universe) of users using certain services, consuming content, and being exposed to events, to quantify information regarding the reach, engagement, and type of activities, and to provide such data for research purposes to understand how popular certain properties are, how users use such properties, what is the engagement level with properties, what kind of outdoor or on-screen advertisements or promotional messaging users were exposed, etc. There are indeed a great variety of applications that benefit from the embodiments of the present invention in multiple different industrial fields.

The expression "a number of" refers herein to any positive integer starting from one (1), e.g. to one, two, or three.

The expression "a plurality of" refers herein to any positive integer starting from two (2), e.g. to two, three, or four.

The expression "data transfer" may refer to transmitting data, receiving data, or both, depending on the role(s) of a particular entity under analysis relative a data transfer action, i.e. a role of a sender, a role of a recipient, or both.

The terms "a" and "an" do not denote a limitation of quantity, but denote the presence of at least one of the referenced item.

Different embodiments of the present invention are disclosed in the dependent claims. Various other embodiments and further benefits of the invention become evident to a skilled person on the basis of the following detailed description.

BRIEF DESCRIPTION OF THE ATTACHED DRAWINGS

Different aspects and embodiments of the present invention are explained in more detail with reference to the appended drawings in which FIG. 1 is a high-level sketch illustrating different factors of the overall concept in accordance the present invention and various elements of the potential embodiments thereof.

DETAILED DESCRIPTION

The present invention generally provides a system that may be configured to measure behavioral events in connection with various entities such as apps, web sites, notifications, pop-ups and widgets, which are commonly designed for use with wireless or wired digital devices incorporating one or more user interfaces (UI), being either integral or functionally connected ones (e.g. digital (smart) goggles). The solution is substantially device and technology (native apps, HTML5, widget, etc.) agnostic and obviously has major applications in a number of businesses around media/Internet behavior tracking as deliberated herein.

Even further, the present invention yields a feasible platform for tracking physical objects or exposure to device-external events or objects as seen, or at least potentially seen, by the user and optionally collected by means of wearable technologies (goggles, smart clothing, etc.), using similar approaches as regards to the identification of the content and digital services that the users consume via the integral (fixedly attached) screens of e.g. smart digital devices like smartphones.

Figure 1:
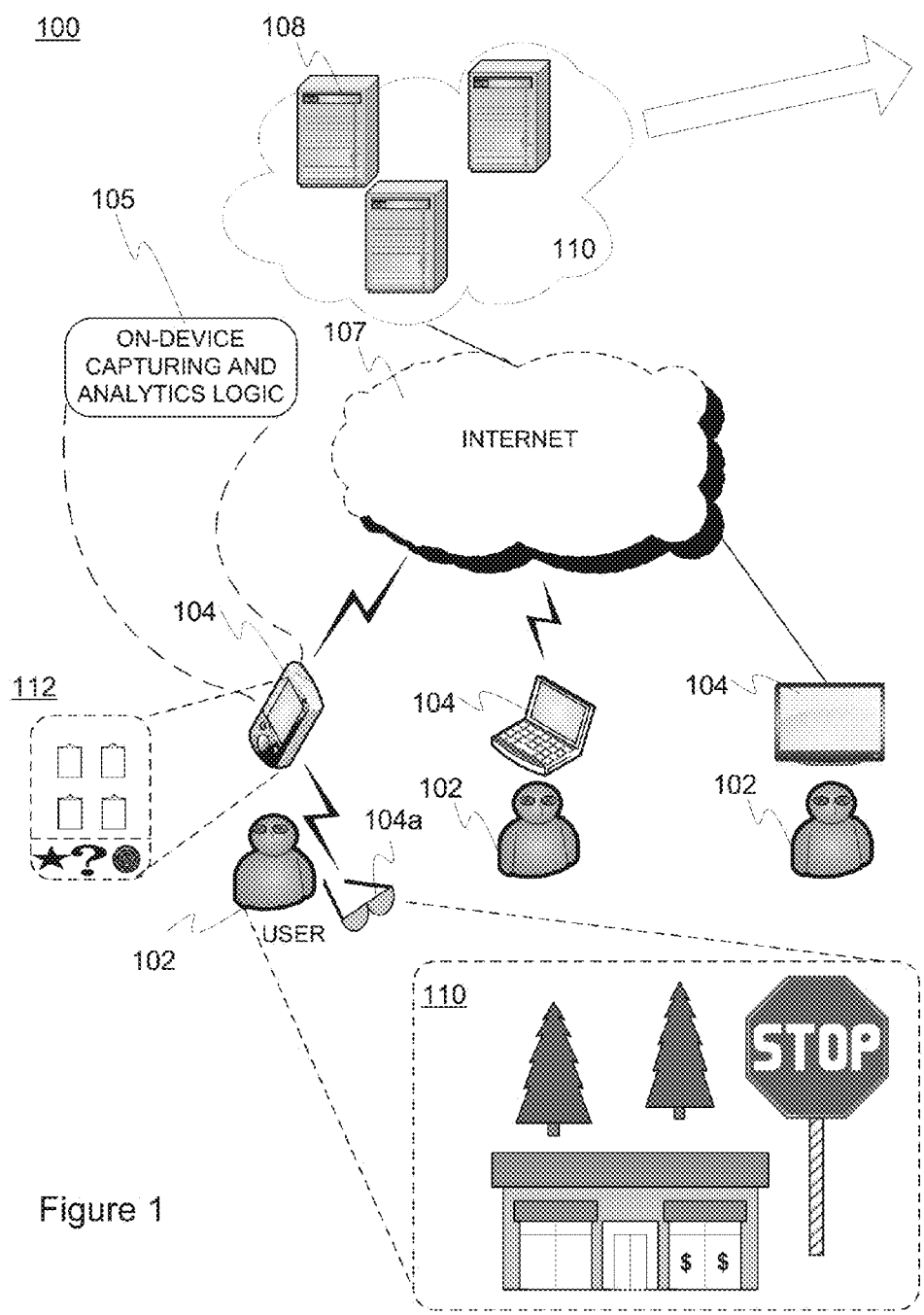

FIG. 1 shows, at 100, a high-level sketch illustrating different factors of the overall concept and system in accordance the present invention and various elements of the potential embodiments thereof. The users 102 access and often carry with them different digital (user) devices 104 such as computers, mobile phones like smartphones, tablet computers, and smart TV's that may bear data collection and analytics logic 105 to be utilized in connection with the present invention for collecting, processing and distributing data on user behavior, digital transactions, user exposure to on-screen or external activity, user attention, etc.

The devices 104 may further be at least functionally connected to other devices, e.g. wearable technology/devices like digital (smart) goggles 104a or smart watches, which may provide data thereto for analysis, if not bearing the necessary processing, memory or data transfer capabilities for autonomous data logging and crunching. Both on-device (see screen capture 112) and external, see the extract 110 of the environment in the physical world where the user 102 is situated, activities and related phenomena such as user attention may be measured by the present invention as to be described in more detail hereinafter.

Entities external to the measuring digital (user) devices 104, 104a may include different remote servers 108 organized into one or more arrangements 110 comprising at least one server each containing e.g. a number of databases for storing data provided by the digital devices 104, processing logic for processing, enriching, and aggregating data, and data transfer interface for transferring, distributing data. These entities may be reached via communications network(s) 107 such as the Internet.

Figure 2:
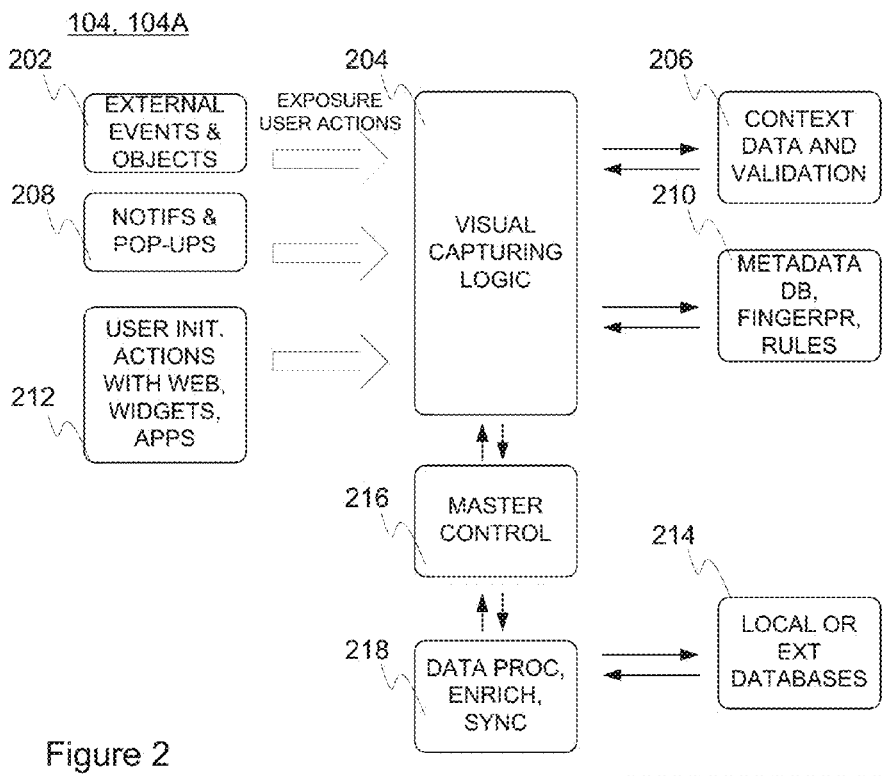
FIG. 2 illustrates an embodiment of the system in accordance with the present invention in more detail with emphasis on functional aspects.

FIG. 2 discloses, via a combination of block and flow charts, an embodiment of the present invention when adapted to the measurement of both on-device and external environment (physical world) events. In some implementations, many or in extreme case, all shown entities may be realized at a single digital device.

The invention may be utilized in several contexts. In one context visual data such as a visual (re)capture (e.g. screenshot) is taken. It reflects the content of the display screen that the user at any particular time is able to see. The display may be e.g. an OLED (organic LED) display of a smartphone or tablet, for instance. One other technical context includes the application of the technology together with cameras and any other sensors attached to the digital smart devices, wearable devices (smart watches or digital goggles), etc., whereupon the visual data reflects the objects in the physical world (e.g. retail stores, outdoor advertisements) and/or some digital content overlaid with a background of real physical or virtual content.

For example, the user may be exposed to visuals through the use of digital goggles wherein some notifications are showed as augmented while the background image substantially consists of the real physical background visible to the user. The background image may be implemented by means of an optically transparent surface of e.g. glass or plastic that enables the user to see through it and inspect the environment while additional data may be projected on the surface in HUD (head-up display) fashion thus forming an aggregate screen, or also the background (video) image may be provided via small digital display screen(s) disposed in front of the user's eyes and attached to the goggles frame. In the latter case, the image may be provided utilizing a number of cameras mounted on the goggles.

External events & objects 202 may refer to the exposure to outdoor advertising or other objects/events sensible in the environment, for instance. Notifications & pop-ups 208 may be monitored on projected virtual (surface) or actual physical screen. Further, user-initiated actions 212 with applications such as web browser, widgets, etc. may be monitored.

Visual capturing logic 204 refers to the technology and techniques utilized for data input such as camera(s), screen scraping, and augmented reality overlay logging.

Contextual data and validation 206 refers to acquiring and logging of data indicative of e.g. user attention, temperature, ambient sound, light (i.e. desired environmental parameters), speed, acceleration, etc. by means of suitable sensor(s), when available and activated. It may provide the data to visual capturing logic 204 and monitor and serve related requests by the logic 204.

Metadata database, fingerprints library and rule library included in the item 210 are rather self-explanatory to a person skilled in the art. It 210 may, for example, serve requests to identify or categorize an object such as icon, window, text, or related application and return appropriate confirmations. The metadata database may be user (device) created or maintained meaning that the digital user devices may identify new on-display or external (e.g. via camera) objects and provide indications thereof to the database or entity hosting the database for optional processing and addition therein.

Master control(ler) 216 refers to the control of sensors, such as sampling or performance thereof, included at 204 and on the other hand, receipt of captured data and relating interpretation rules therefrom 204.

Data processing, enrichment and syncing (with potentially external entities such as servers) are executed at 218. Accordingly, local and/or external databases 214 and other entities are utilized for storing logged activities and exposure events, optionally further exploiting universal metadata database 210 for the purpose. While entity 214 receives logged information from block 218, it may provide control information such as logging rule updates, various settings back to thereto.

Figure 3:
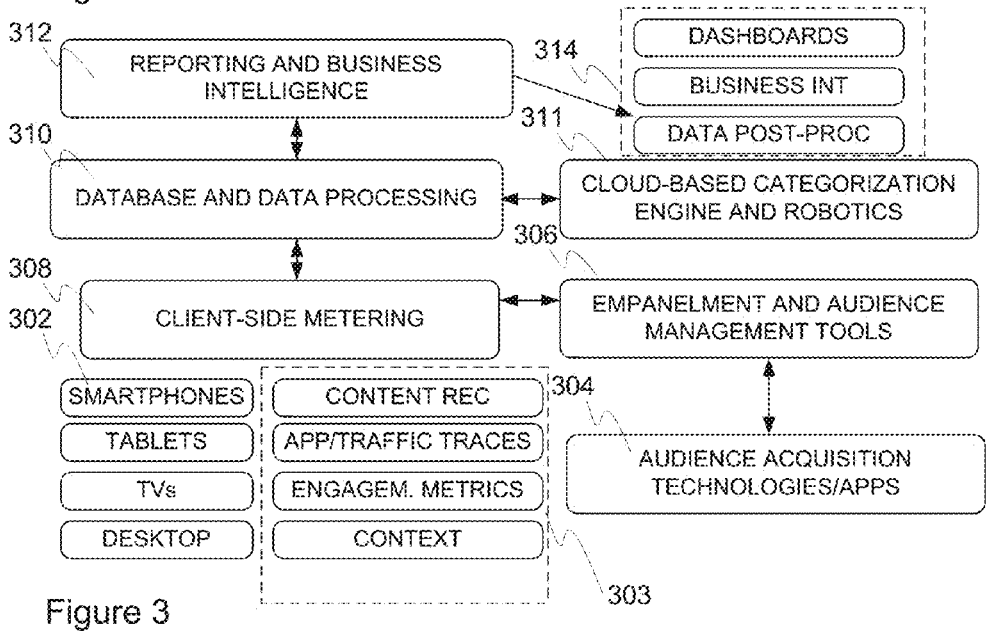
FIG. 3 illustrates application of the present invention in panel-type research according to one feasible embodiment.

FIG. 3 provides general insight to the utilization of the present invention in panel-type research incorporating aspects of content recognition, application/traffic traces detection, determination of engagement or attention metrics, and context recognition 303. As mentioned hereinbefore, the present invention generally relates to mobile devices and other similar devices 302 connected to wireless communications networks, but can be also applied with desktop computers and other digital terminals. It suits well e.g. different panel-based research methodologies through the use of SDKs (software development kit) that are embedded in apps/services distributed to the user's online and/or mobile devices to enable on-device client side metering 308, for example.

Applicable audience acquisition technologies 304, e.g. apps or app-embedded features, and empanelment/audience management tools 306 may be utilized for hiring the respondents (panelists) and controlling the associated panels. Both the client-side digital devices utilized for data logging as well as external entities such as servers may be exploited for hosting the databases for the data and actually processing the data 310. Multiple entities may participate in the procedure optionally including e.g. cloud-based categorization engine and related robotics/automatics 311. Reporting and business intelligence platform 312 may provide the end-users of the collected, analyzed, aggregated and cultivated data with desired types of post-processing features and output elements, such as reports, database views, dashboards, etc. 314.

Figure 4:
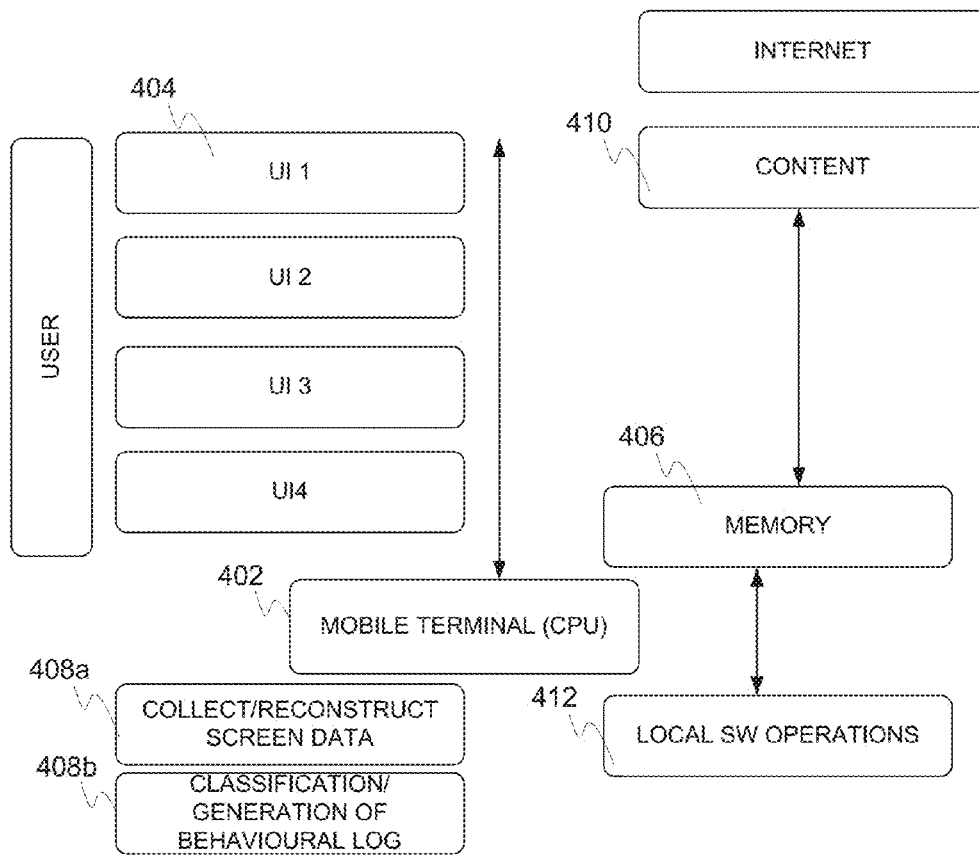
FIG. 4 illustrates an embodiment of a digital system, implemented by at least one device, hosting the hardware and software controlling the hardware for data metering and communication in accordance with the present invention.

With reference to FIG. 4, one preferred embodiment of the present invention is illustrated at 400, highlighting the functionality of the metering software/application vs. remote entities, such as Internet servers, and different UIs to be monitored. The disclosed system includes on-device downloadable software that is able to smartly run in the background of the hosting digital device (e.g. smartphone, tablet or other computing device) using battery and CPU-optimization to avoid unnecessary changes for the user experience. This software runs advantageously in a central processing unit 402 (containing e.g. microprocessor, microcontroller, and/or signal processor) of the terminal, being thus close to the operational heart of the device and associated user interfaces 404 can be all captured at this point of convergence. The device might have multiple different user interfaces (headsets, digital goggles, smart watch etc.), or only a single one, such as a touchscreen. The user interfaces such as screens and/or various sensors may be fixedly (integral solution) or removably/functionally attached to the device. The device may comprise memory 406, in the form of a number of memory chips, for example, and/or integrated with other elements such as processing elements to host the metering software and store the collected data, settings, various applications, etc. The memory 406 may be utilized by local SW operations 412, optionally executed by procedures regarding the generation of screen images (screenshots or other visual data), subsequent recapturing/reconstruction and identification of characteristics therefrom, etc. 408a and data classification/generation of behavioral logs based on the analysis of data 408b. Yet, data stored in the memory 406 may be provided forward to external entities reachable via the Internet as well as data received therefrom 410.

The metering software is preferably enabled to communicate on a system-level with other digital devices the user might own and use, these other devices also having metering software installed thereat.

With particular reference to item 408a in the figure, this software running on the background as the device executes other actions and the user potentially interacts therewith is configured to optionally periodically capture screen images, and with on-device logic to reconstruct them including e.g. compression, identification of digital fingerprints (e.g. certain pixels, pixel groups, configurations) or generally text, colors and symbols (e.g. App or Company logos) therein, identification of certain screen/display view areas, and/or provision of a set of compressed characteristics vectors (one could call it as the "DNA of the property/service/app") describing the identity of the content in the desired level of detail (category- or e.g. app-specifically).

Advantageously the software is further configured to utilize a number of (other) log files like HTTP traces and app activity logs to support decisions and to control the logic of metering the screen content through screen capturing. In further embodiments, the solution may be arranged to track available audio channels (audio playback, microphone signal(s), etc.) and record audio samples for audio matching purposes.

Yet, with particular reference to item 408*b* in the figure, the meter is advantageously configured to collect other relevant data points and associate or link these with a particular action of the user. Still, the metering app may be configured to generate a heartbeat signal (indicating when the device is on), and to generate signals reflecting engagement (acknowledging that the screen is on, for instance) or other exposure (e.g. something is visible in digital goggles and the user is moving, or something is audible in the headsets and user has the headsets on).

The metering software may be configured to generate a log file of the recognized items or events illustrating e.g. which devices are being used, in which context, in which mode and/or with what user interfaces.

These data vectors can be statistically matched with a reference library (in the categorization engine) to further add meta-data and classification information.

In practice, a selected set of people may be allowed to download a specifically composed data collection application to one or many of their Internet-capable devices, including smartphones, tablets, wearable technologies (smart watches, belt computers, digital goggles etc.), laptops, desktop computers, TV-sets etc.

The application may be composed of at least two major elements. First, there may be a user interface, being able to show basic information to the user, like the status of the metering app, while providing simple options for user-app interaction as well (for example the option of syncing the data from the meter to the Internet through a button or other triggering feature).

Second, there may be a main application, also called as a background running logic, which is responsible for collecting data in one or separate threads, being preferably configured to conduct optimized pre-processing of data and/or to communicate with network-based servers to transfer the data there. In addition, the main application may be arranged to receive configuration messages from the network and facilitate registering the user when the app is installed for the first time.

The main application is preferably designed as resistant against any technical process or user behavior that could otherwise result into the main application being turned inactive. The main application may therefore include features like a watchdog, which is able to initiate a separate process that checks whether the main application is running or not, and if it is not running, to reinitialize it so that the main application may return to its activities on the background. The main application preferably includes feature(s) to verify that when the device is turned off and back on, in which case the main application is always started as a default.

One practical example of the optimization of the meter application concerns the verification of activities/transactions taking place on the screen, including for example mobile payments. The image capturing and further reconstruction/recognition of the related data may be executed only if certain hard-coded or dynamically defined events first take place (for example, payments are only tracked and recognized for certain apps and/or web sites, not all of them).

Another practical example of optimization concerns data sampling when used with digital goggles or other camera-based approaches to reconstruct what the user is able to see at any given moment. In such events information about the ambient light (if it is dark, the sampling should be restricted to a low frequency) or user attention (if it is observed that the eyes of the user are closed and he is potentially sleeping, the sampling could be restricted to a lower rate and/or any events logged about exposure be invalidated) is helpful in constructing a realistic stream of information about the actions and true exposure of the user.

The metering application is also able to optimize battery drain through the dynamic and configurable use of device APIs. For example, when less granular data is needed, the invention is able to track app usage characteristics and names, or web site URLs and names, through locally cached data fields, which provide a reflection of the previous activities without providing real-time view on those. Similarly, network based servers, e.g. virtual private networks, may be dynamically utilized to collect some of the required data without the need to then collect this data locally from the digital user device.

Nevertheless, there may be an integral part of the main application which is able to track explicitly what happens on the screen. This general tracking task may be considered to include e.g. the three following aspects.

First, the screen power may be observed. If the screen is turned off, the main application can provide a log entry that the user is not doing anything, or not at least anything visual or screen-intensive. Today's computing devices may still execute a number of applications on the background at any given instant, but the user does not actually use or engage with them. The screen power observer may be used to validate this engagement and preferably filter out activities that are not about real engagement.

Second, the application programming interfaces (APIs) that provide direct information about the active application or other entity on the screen may be accessed, optionally substantially continuously. This information, together with the aforesaid screen power observer, is able to give in best cases very precise information about the type and identities of the activities people do on the screen.

Third, the main application may be arranged to execute screen sampling, or take screenshots, at defined frequencies. These screenshots can be at least pre-analyzed in the device, and a number of know shapes, colors, icons, symbols, lines, or other characteristics can be observed. If certain conditions are fulfilled, the screenshot is provided to further analysis either locally in the main application or in a network server.

The use of screen capturing may involve utilization of several innovations. One may incorporate a process where a separate catalog of library of characteristics vectors are optionally periodically downloaded to the device and the main application is able to access this information, and configure the screen capture observer to run only when selected applications are open, for example, and then to e.g. periodically execute the screenshots and reconstruct main characteristics of such through e.g. widely known image recognition tools and approaches. A set of characteristics is outputted, and if any of those match the library, further actions may be done. The further actions may include scraping the text visible on the screen. For example, in the case of mobile payment tracking, standardized pop-ups may be searched for and when recognized, the price and content of the transaction can be extracted and written into a log file.

The other approach may involve the use of screen capturing and generation of characteristics more continuously. This implies that e.g. a number of specific pre-defined shapes are optionally substantially continuously (what the actual sampling frequency then is, may differ from embodiment to another as acknowledged by persons skilled in the art) tracked, detected and logged from the screen captures, or the application is generating a simple, compressed, set of characteristics out of each screenshot. These screenshots and/or compressed versions thereof may be stored locally and/or optionally sent further either substantially immediately or later (according to schedule, for example) e.g. to a network server for further analysis. The characteristics or fingerprints detected may be then sent continuously forward for matching with pre-defined fingerprints, for instance. If the processing unit is able to interpret the content, in other words to match the detected characteristics with something known, the log file is generated at that point to reflect what the user actually did.

The screen capturing logic preferably involves a number of libraries of fingerprints, i.e. the 'DNA'. These libraries may be custom built (a manager will activate a certain app, and run the image recognition and fingerprinting process, and see what will come as a result and the outputs, together with information/meta data about the used app, is written into the library), and/or the generation procedure may be automatic, which may imply a robot downloading apps and content from a number of networks, at the same time logging their identities and other information like content category, starting them and then constructing the image fingerprints of the application or service, and writing the metadata and fingerprints into the database. One application or service will typically bear a number of characteristics (e.g. repetitive patterns) feasible as fingerprints, which can be then used for matching purposes.

The screen capture technology therefore works in both local mode (with pre-defined library of fingerprints) and network mode (matching is at least partially done on the network side/network server(s)). The overall system is preferably designed such that the main application, as part of metering, is preferably only or mainly executing the light weight processes, and either through batched work in the local device, or then then through on-demand or batched work in the network server, the matching algorithms and other more sophisticated scraping technologies can be run both timely and physically separately from the first level data collection and image recapturing.

The additional so-called technical measurements, like process thread observers, may be combined, and/or data therefrom may be combined, with the screen-based observations, to reconstruct the most comprehensive and detailed log file of user activities. For example, it may be that the screen observers only validate that the user was engaged, and/or what was the activity name, but the detailed technical observations may be desired in obtaining more information about things like the duration or type of activity etc.

The afore-explained screen capture technology may be specifically tailored to recognize quickly repetitive and standardized shapes, for example in-app and in-game transactions and payments, use of widely used mobile applications and their features (authentication, payments, actions). The technology also works with applications that are, for example, based on web-based technologies (HTML5 widgets) but do not generate traditional HTTP requests, and cannot be observed by technical observers running application process threads, for example.

The generation of fingerprints is a relatively sophisticated process and involves the observation of changes in the screenshots coming out of a process of using a certain service or application. When a significant change has happened according to predetermined criteria, it will be investigated more thoroughly what has changed and what has remained unchanged. The objects, colors, shapes, that are static/do not change, are the ones that are preferably to be stored as the fingerprints of the service or app. These may be sometimes text strings, sometimes simplified shapes like logos, and sometimes a set of colors. Machine learning approaches may be used to generate the fingerprints in an efficient manner, learning from a high amount of data supplied to it from simulated test runs (or manual test cases).

Advantageously, the matching of screen captures and resulting fingerprints with the library is executed with error correction and also through a process allowing for a defined amount of variance in the content of the fingerprints. The fingerprints, particularly the complex ones, do not need to be identical with screen features to find a match. The system may apply decision rules such as the 'highest-correlation', with a defined threshold, to accomplish the matching.

The embodiments of the screen capture technology are preferably configured to observe how many windows or frames there are present or open/active in the device, and to reconstruct the identity of each application or service for each window, separately. By interpreting the screen captures, it is also possible to tell which the active window was (and which was inactive). Active window may have a cursor or pointer thereon, or some graphical identifier such as top bar rendered differently/looking different from the other windows. By obtaining screen captures of other functionally attached user interfaces (like digital goggles), similar repetitive objects can be again identified, communicating about the services and applications that are overlaid over a potentially much more varied content (e.g. on digital goggles the system observers, repetitive commands and application characteristics running on top of the normal landscape as seen by the human eye).

In or with measurements that either identify or validate the status of the device or one of its user interfaces, the system may also be configured to tag other measurements and enrich the classification of usage metrics. For example, if the screen capture technology is able to recognize that no visible activities are observed on the display, it may instruct selected other module(s) of the invention to tag all other measurement data as "background usage" for the respective time periods.

Similarly, the screen capture invention is able to differentiate between "one-window screen" and "multiple-window screens" and together with other data (if not alone) describe when a certain app/service is actively used on the screen and visible, or if something is just visible but not actively used. Similarly, the invention is preferably able to tag HTML5 based widgets separately from native apps, and differentiate web browser based usage from other kinds of usage.

A specific embodiment of the present invention deals with the integration of different types of data streams either locally in the data collection device (through the addition of relations), or alternatively at the server, or together. For example, screen capture based observations may be combined with app usage or process thread logs, or device-based metering data may be collected with network-based data, and through the utilization of associated relations and time stamps, the different data sources can be brought together and data streams integrated. By applying a number of analytics and categorization processes, second-level or generally higher level data streams may be regenerated based on the original data streams. For example, a log file describing user activities on the online property level may be generated through the combination of application process thread logs, HTTP data streams, and image recapture based event log files. In the combination of data, either dynamic on-demand processing of the data or various post-processing activities may be performed with the intention of making separate data streams comparable to each other.

Figure 5:
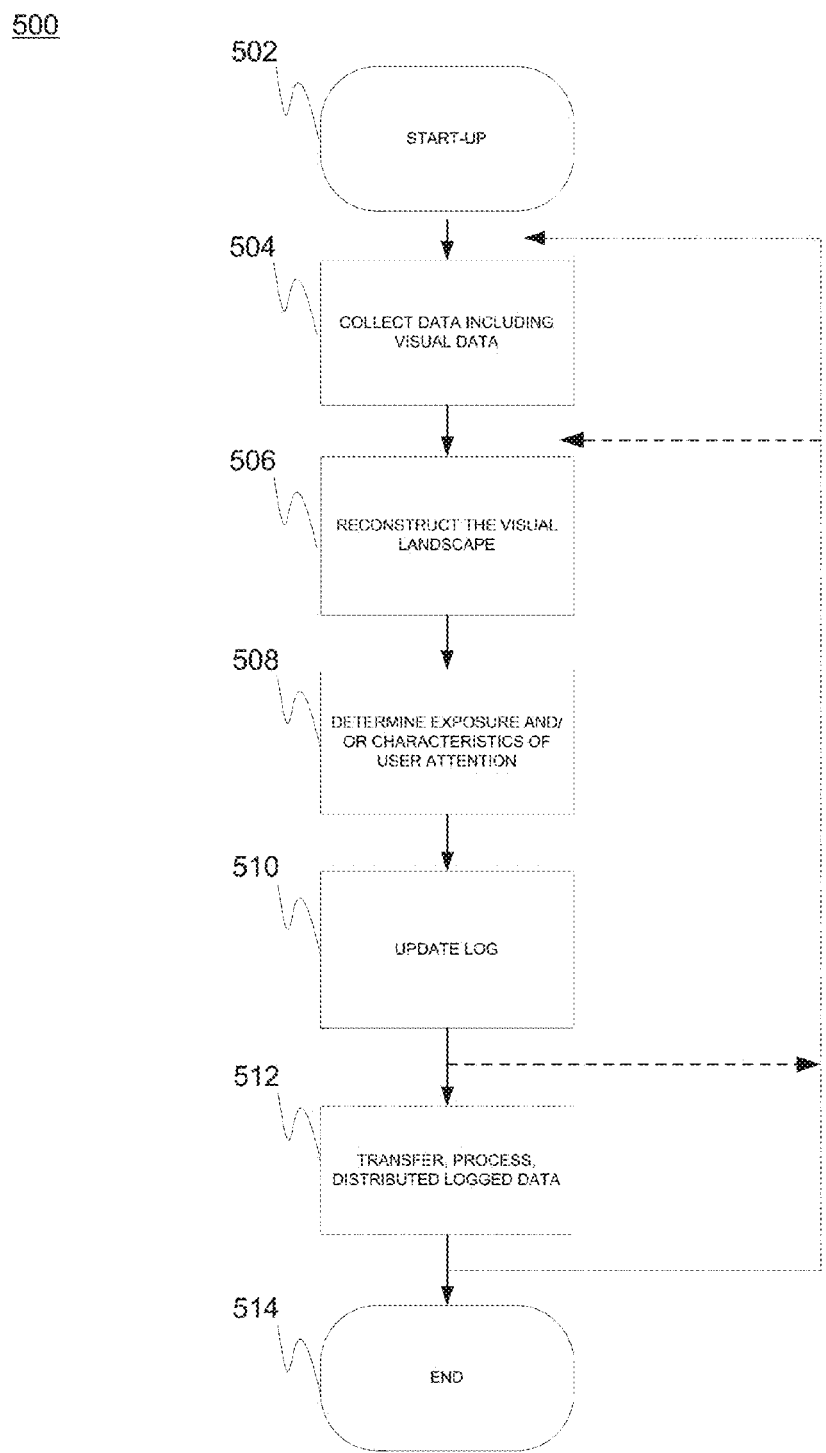
FIG. 5 is a high-level flow diagram of a method in accordance with the present invention.

FIG. 5 is a flow diagram 500 representing the high-level items of an embodiment of a method in accordance with the present invention.

Method start-up 502 may incorporate installation of metering software to digital device(s) and ramping up a network service/server arrangement of one or more servers for hosting e.g. fingerprint or metadata databases for the data collection or analysis and receiving collected data from the digital device(s) for storage, aggregation, analysis, and/or distribution.

Data collection procedures are initiated 504. The obtained data preferably includes visual data that is data reflecting the content and objects that are shown on the display of the digital device, projected, or present in the environment, for example. The visual data may include e.g. screenshot data and/or other data, such as various technical data that still reflect the elements and entities that the user may perceive on the device screen or in the environment. The user potentially and in many cases, likely, truly perceives such visual and also visible data with his/her eyes, but that may not always be the case as the user's attention may be somewhere else or spread across various different things. The data may be obtained by means of screen capturing (screenshots, etc.), monitoring user interaction with the device (e.g. user input via user input technology such as touchscreen or button(s)/key(s), passivity/lack of input, point of focus based on e.g. feature such as eye tracking (camera), sound/microphone data, movement/acceleration data, etc.), and generally through various available sensors such as camera(s), microphone(s), accelerometer(s), temperature sensor(s), pressure sensor(s), light/illumination sensor(s), touch-sensitive sensor(s), etc.

At 506, the perceived (or in practice, likely or at least potentially perceived) visual landscape is reconstructed based on the collected visual data and further other data such as processing rules/methods for the visual data and related parameters, metadata, various sensor data, and e.g. fingerprint data describing different features or items that could be detected or identified in the visual data. For example, icons and text strings indicative of actions such as payments/purchases, ad interaction, widget usage, etc. may be detected. Various techniques of image recognition may be exploited as thoroughly explained herein.

Accordingly, user exposure and preferably different characteristics of likely user attention, such as the target(s)/level thereof, relative to seen items such as on-device or external (e.g. posters or digital signage) ads, widgets, apps, etc. are determined at 508. Obviously, the determination result is still an estimate of the exposure and attention based on the available information, but based on empirical testing provides generally accurate results.

The analyzed data is selectively stored in a number of local and/or external logs at 510. Provision of data outside the collecting digital devices will incorporate transferring the data forward, e.g. continuously/substantially instantly or as scheduled, using available data transfer technologies, such as wireless communication/computer networks, for remote storage, aggregation, processing/analysis, and/or distribution by server entities, for instance, which are indicated by the optional method item 512 depicted using a broken line.

The loop-back arrows highlight the likely repetitive nature of the execution of various method items to enable continuous or intermittent monitoring of the user exposure and attention. The method execution is ended at 514.

Switching over to more comprehensive description of the general framework of analyzing screen-capture images in accordance with few feasible embodiments, technical basis for extracting valuable information from screenshots and the like specific to particular tasks, such as tracking of payments in browsers or apps, widget usage tracking and in-app advertisement tracking among many, is provided.

The idea of analyzing smart device screenshots could be, among other alternatives, categorized as a method of performing Visual Scene Analysis (VSA) on smart devices. Visual Scene Analysis is a topic which has its roots in Machine Perception or Computer Vision, and is similar to Pattern Recognition in purpose but different in scope.

The goal is to extract, from images, not only patterns but also high-level information about the whole scene. In the context of smart digital device screen-shots, such information may incorporate retrieving the text and the icons, or other graphics, presented on the screen, in order to understand what the screen is displaying to the viewer, automatically and without intrusion. Such information is useful in describing various kinds of device-user interaction, and may be of high technical and commercial value to many companies and across varied sectors.

One exemplary use case of this framework, amongst many others, comprises actively tracking which category of advertisements a user clicks on within an app, and which are the advertisements the user closes (by pressing the "x" button, for example) or ignores, thereby providing an active feedback regarding user preferences. Another example to illustrate the variety of this framework may include tracking and confirming payments made inside an app, whether it means purchases inside games or e.g. bill-payments made through online wallets. Hence, the number of scenarios where this invention will prove useful is considerable and will only grow with the evident increase in the number of types of smart devices.

Figure 6:
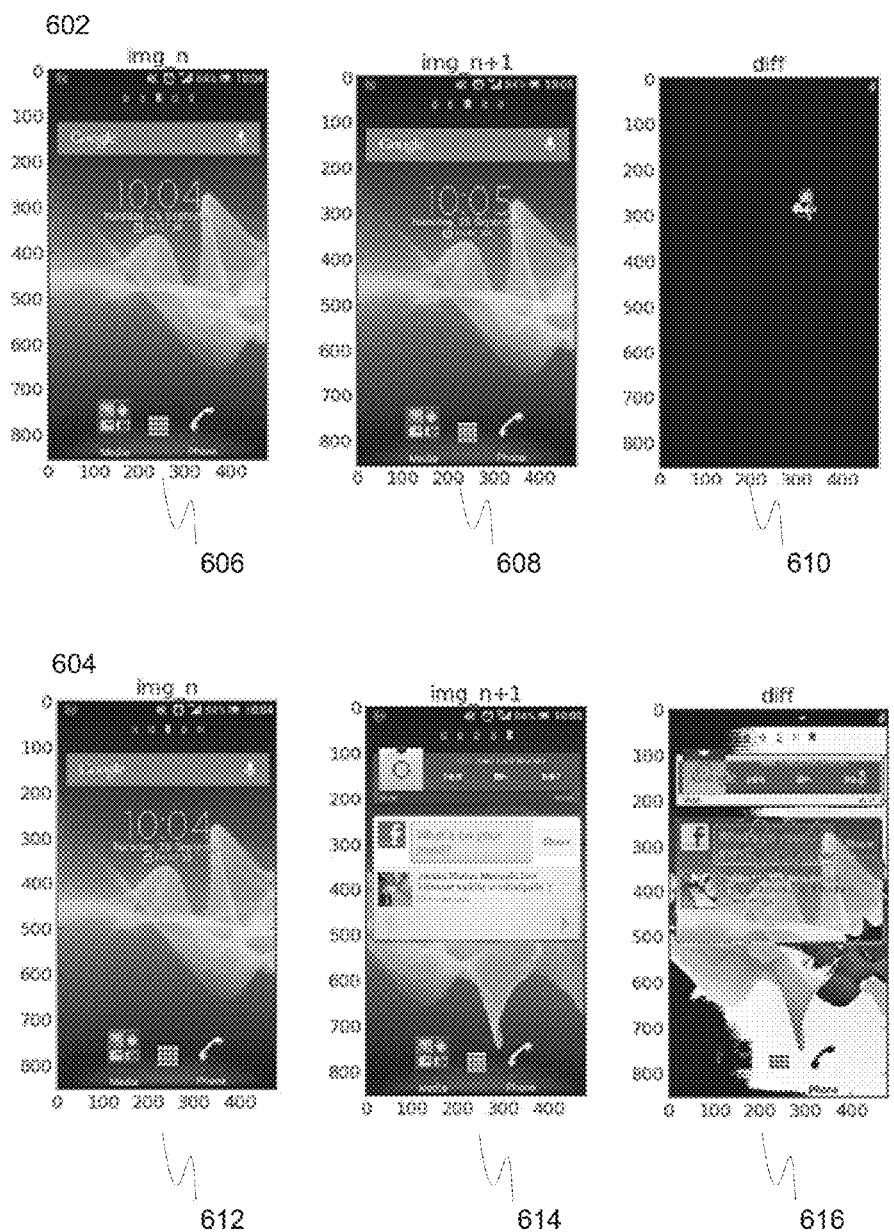
FIG. 6 illustrates the functioning of an embodiment of a difference imaging method via a couple of screenshots and related difference images.

The general process of extracting useful information from screen-capture images may be initiated by acquiring screenshots from a smart device, at a rate which is determined by type of analysis to be performed and/or the user activity, for instance. Thus, the rate of screen capturing could be high, in short bursts, when an important activity according to the utilized criteria, such as an online payment, is to be tracked, as compared to the rate when the user is idly browsing on his smart device, or when the screen is on but the user is not interacting with the device at all. The rate may be chosen from a set of predetermined values, each one corresponding to a specific case or behavior to be tracked, or it may be determined online For online adaptation, a rather intuitive technique known as "Difference Imaging" maybe used, where the absolute difference between successive images is taken, thresholded and analyzed for changes. If the rate of screen-capture (initialized to a default low value, for example) is such that the difference image between two successive shots is mostly blank (i.e., there is very little difference between the screenshots), then the current rate is maintained or lowered, otherwise it is increased and the analysis repeated. Once the rate has been increased (by the adaptive algorithm), it will stay the same for a preset amount of time, before reverting to a default low value, which optimizes battery usage and minimizes consumption. A few exemplary images are provided in FIG. 6, wherein each row 602, 604 has three images, the first two are successive screen-captures and the third one is the difference image.

The first row 602 represents a case where the screen is practically idle but on, whereupon the changes 610 between two screen-shots 606, 608 are minimum (in this case the only change is that due to the changing clock data). In turn, the second row 604 shows a case where the user is active and the difference 616 between screenshots 612, 614 is high. A metric may be determined to assess the fractional change C, such as:

$$C = (\#pixels > T)/(\#rows * \#columns) \qquad (1)$$

If C is substantial (more than a threshold, say, $C_{large}$) then a change is said to have occurred between two images, otherwise not.

In line with the definition of C and $C_{large}$, the rate of screen capturing via screenshots, R, may be defined e.g. as seconds. Initially, $R = R_{default}$ and is increased in steps of $\Delta R$. Also, the time gap between successive screen-shots, when the rate is R, is (1/R) seconds. The thresholds $C_{large}$ and T as well as the values for $R_{default}$ and $\Delta R$ can be determined experimentally using test images.

Figure 7:
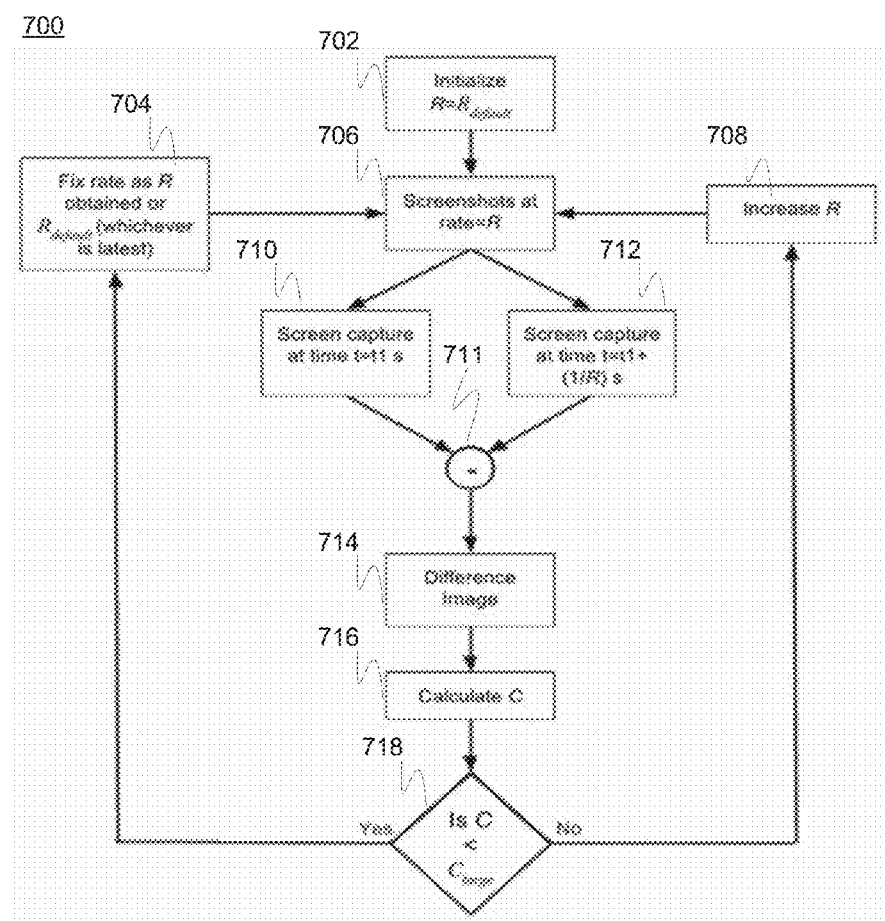
FIG. 7 is a flow diagram of an embodiment of screen capturing and in particular, related rate adjustment procedure.

With these definitions in mind, more thorough algorithm given in the flowchart of FIG. 7 for screen capturing control may be inspected next.

Thus, the algorithm 700 begins by setting R to match with a default value $R_{default}$ at 702. The value shall be suitably configured so as to capture enough information regarding the user activity, while not being too demanding e.g. on the battery (since taking screenshots consumes the device battery). Once the screen-shots have been taken 706, 712 at different subsequent sampling instants, a difference image 714 is constructed at 711 from the consecutive screenshots 710, 712 and analyzed 716. If the differences are significant (i.e., a high value of the parameter C, for instance), the rate R is incremented at 708 by a value $\Delta R$, and the process is repeated with the value of R fixed at the new value. Otherwise, old value or e.g. default value may be utilized 704, i.e. once the difference image is no longer significant according to the utilized criteria, the rate R is not incremented.

Since it can be expected that tracking of various rather important behavioral events, like purchase/payment tracking where it is important to rapidly capture screen-shots in sequence to confirm a purchase/payment having been made, will only last for a few seconds, the potentially considerably increased rate R will be reverted back to the default rate after a preset time period to avoid excess battery drain.

Apart from the option of adaptively determining the screen capturing rate, a more power saving option could be to utilize preset values for the rates at various different scenarios and to choose the appropriate rate according to each particular scenario detected. For example, there could be dedicated preset values of the screen capture rates for different scenarios such as idle browsing by the user, purchase tracking, and/or in-app interactions depending on the nature of the app, etc.

In order to track the various forms of interaction between the user and the device, it may be necessary to know whether a screen capture image is that of a home screen or menu, or a one acquired from within some app, for example. Once this information is known, the process of analyzing the image can continue in very specific directions in order to look for the presence of particular features. For example, if on the home screen, the payment tracking mechanism will not be activated, and if inside an app, the widget-usage tracking process will not be started whereas some other detection processes will be.

This information may be acquired e.g. in two ways, the first being through the acquired metadata from the digital device (using metering software). In addition to this type of approach, a novel algorithm to briefly determine whether a screenshot is a home/menu image or e.g. an in-app image may be utilized. An embodiment of such algorithm is reviewed hereinafter with reference to FIG. 8.

The home/menu screen is typically different from the in-app screenshots because while the screenshots from within an app might have varying properties, the properties of a home/menu screenshot can be more finite and defined, and thereby they can be learned and subsequently detected.

Home/menu views often exhibit the presence of many icons that can be observed apart from the presence of e.g. a battery bar. Further, dedicated elements, e.g. small, white, (filled and non-filled) and round objects, henceforth called "menu indicators", may be depicted e.g. in the central portion at the top or bottom of the screen to indicate how many menu windows the user can navigate through. Observing various screen-captures from different devices and platforms, the presence of icons and/or the menu indicators may be adopted and potentially utilized as generalizable, characterizing properties of menu/home screen images. Accordingly, it will be presented next how to locate and match menu indicators to discriminate between home/menu and within-app screen-captures, since it is usually much faster and computationally lighter than localizing and matching icons.

Figure 8:
FIG. 8 shows few screen captures acquired from digital user terminals with menu indicators to be detected by an embodiment of a screen capture analysis procedure in accordance with the present invention.

FIG. 8 contains four screen captures 802, 804, 806, 808 taken from different devices (mobiles, tablets) and brands (Sony™, Samsung™) clearly showing the presence of the menu indicators 802a, 802b, 802c, 802d, respectively.

Figure 9:
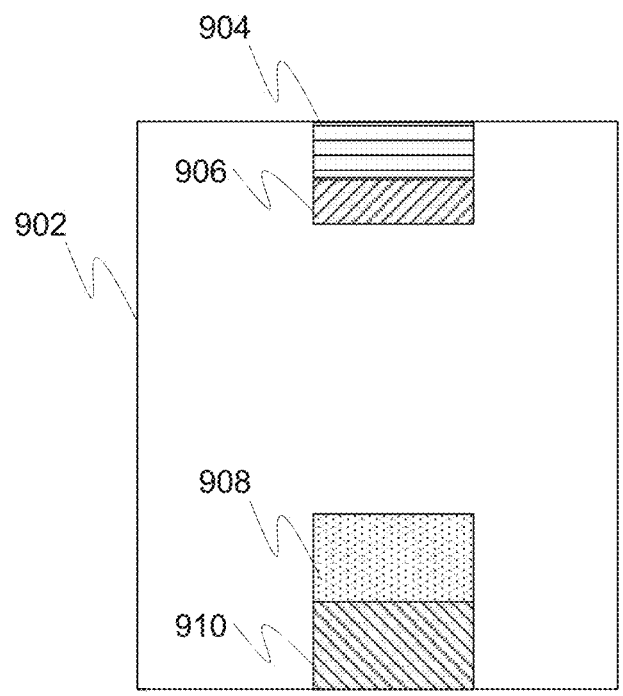
FIG. 9 illustrates potential screen(shot) target areas for a menu indicator search algorithm.

Indeed, home/menu screens on modern devices usually contain some menu indicators. The menu indicators may consist of or at least comprise objects which may be round or rectangular (with or without rounded corners), for instance, while they are commonly located in one of four areas in the image:

FIG. 9 illustrates four areas 904, 906, 908, 910 of potential interest in terms of locating menu indicators from a screen capture 902. These areas are basically horizontally centered and exclude the absolute center portion of the screen.

Figure 11:
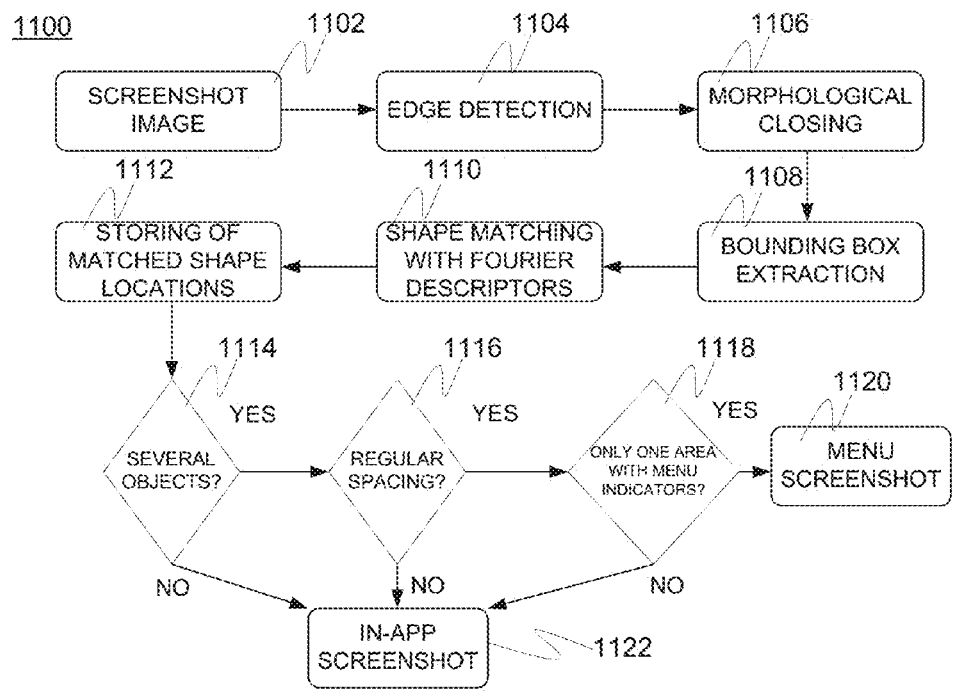
FIG. 11 is a flow diagram of an embodiment of menu/home and in-app screenshot distinguishing procedure.

FIG. 11 shows a flow diagram of an embodiment of the algorithm for shape such as menu indicator tracking. The algorithm may be configured to trace for specific shapes (round or rectangular) within each of these areas 904, 906, 908, 910 of a screenshot image obtained 1102 and report them. If one such area exists where the shapes match with criteria set for menu indicators, then the screenshot is most likely to be a home/menu screenshot.

Figure 10:
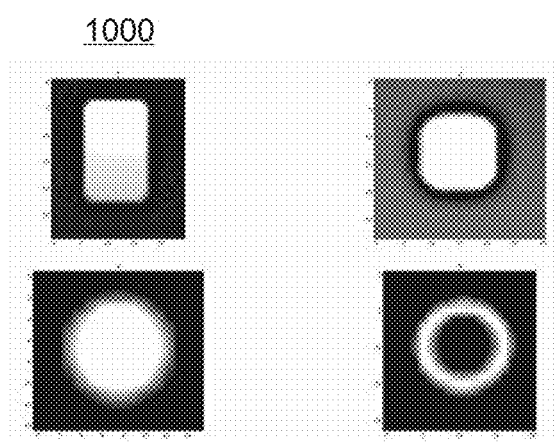
FIG. 10 depicts four examples of menu indicator templates.

The algorithm may proceed, since the screenshot is available, through extracting the edges 1104, e.g. via filtering, from the aforementioned image areas, subjecting the edge image then to morphological post-processing 1106 (e.g. closing, hole-filling), extracting bounding boxes 1108 using connected components analysis and checking whether the shape within each such bounding box matches any of the templates of commonly occurring menu indicator shapes, examples of which are shown in FIG. 10 at 1000.

Shape matching 1110 is a somewhat widely researched area in Computer Vision and there are many methods at one's disposal to achieve good matches. Since the shapes here are relatively simple and straightforward to describe, one feasible method rationally chosen in the present case could be that of matching the Fourier Descriptors of the shapes within the bounding boxes to those of the templates. Fourier Descriptors are fast to compute, using the Fast Fourier Transform, and can be made invariant to scaling. Potentially matching shapes' locations are stored 1112.

In order to make the overall algorithm more robust to other more or less similar shapes, such as the letter 'O', which might otherwise be mistaken for a template, one or more additional check steps may be performed as follows: when an object, such as one in the menu indicator, is detected (by shape matching), it can be checked whether the objects are more than one (or two) in number 1114, regularly spaced 1116 and close to each other/in the same screen area 1118, since menu indicators are seldom single objects but they are very often equally spaced. If these checks are fulfilled, then the concerned area is said to contain menu indicators 1120. Otherwise, the screenshot is deemed to represent other type, normally in-app 1122.

Figure 12:
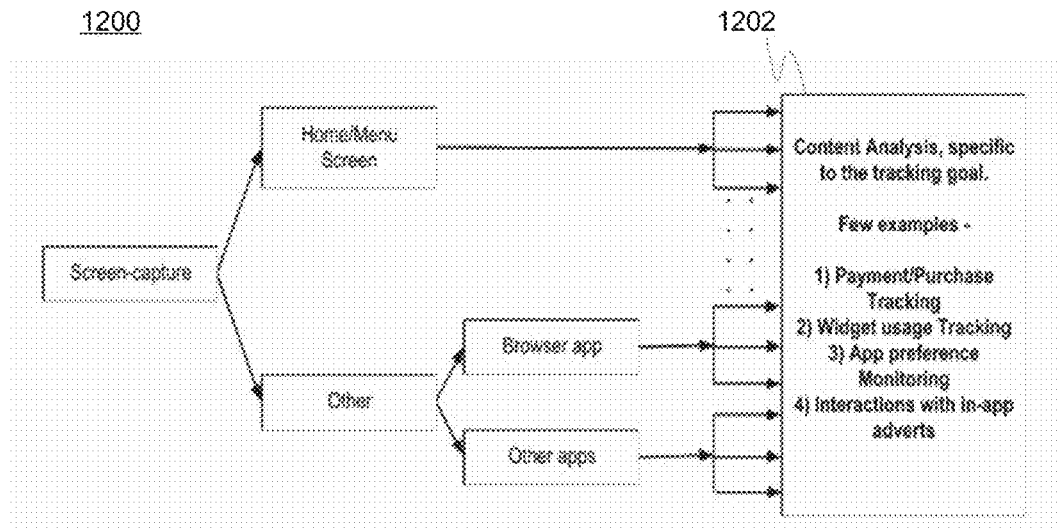
FIG. 12 represents an embodiment of the overall screen capture analysis framework applied in connection with the present invention.

An embodiment of the overall screen capture analysis framework in accordance with the present invention is shown in FIG. 12, building on the methods which have been devised herein. The ultimate step (named "Content Analysis") 1202 depends on the type of analysis to be done. For smart digital devices which are currently in use across the globe (phones, tablets), these tasks maybe one of the few explicitly mentioned in the flowchart (i.e. Payment/Purchase Tracking, etc.). For devices which are promising for the future (such as Google glasses), the model can readily integrate information, such as that user gaze information from eye-tracking, to measure user behavior, like what physical advertisements the user focuses on (looking through the Google glass) and how positioning of those advertisements make a difference. The implications of a general framework for analyzing all sorts of incoming screen capture images, with or without any other form of integrable information, is beneficial for media research and other applications in the present and the future.

In order to demonstrate how the framework can be used, a more specific example is to be provided below with reference to FIG. 13. We may desire to monitor specific facets of user-device interaction, namely in-app and browser based purchase tracking, mobile payment tracking and widget-usage tracking, for example, using the proposed framework and its algorithms. We may, among other objectives, track e.g. in-app purchases made by the users, which is a generally billion dollar industry, without any intrusion of a software development kit (SDK), only using a custom built app which takes screenshots and processes them to track purchases and yield/send output logs of purchases made.

Once a screenshot has been acquired and has been categorized 1302 into a (home/)menu or an in-app/browser image, it is then processed using an algorithm which actively tracks purchases or payments made inside the app or in popular web sites, such as eBay™ and Amazon™.

One underlying idea is to use the information available upon initiation of a purchase/payment process as there are often specific features visualized that guide the user forward. These features may include the presence of a pop-up window, a button or specific words like "Purchase" or "Buy" (usually in the user's language of choice). These features can be spotted and isolated very rapidly, and with a high degree of accuracy, using available image processing tools such as template matching, detecting brightness levels, edge extraction and/or optical character recognition.

Once such a feature has been detected 1304, and the initiation of a payment/purchase process is confirmed, the idea is to observe the following screen-shots to the completion of the payment/purchase process. If the user successfully completes the process, a log of the payment attributes is established/updated (e.g. new entry in an aggregate log), otherwise the purchase is assumed to have been aborted.

In the other case of the screen-capture image being that of a menu/home screen, a widget tracking mechanism 1308 may be triggered. The widget usage tracking is challenging because of the broad search space which a scene analysis algorithm must deal with. Although it is known that the tracking is specifically about a widget or an app icon which is present in a user's home screenshot, the number of probable widgets and apps are in the order of hundreds or thousands, and hence the features to look for are at least as many as that number.

Figure 13:
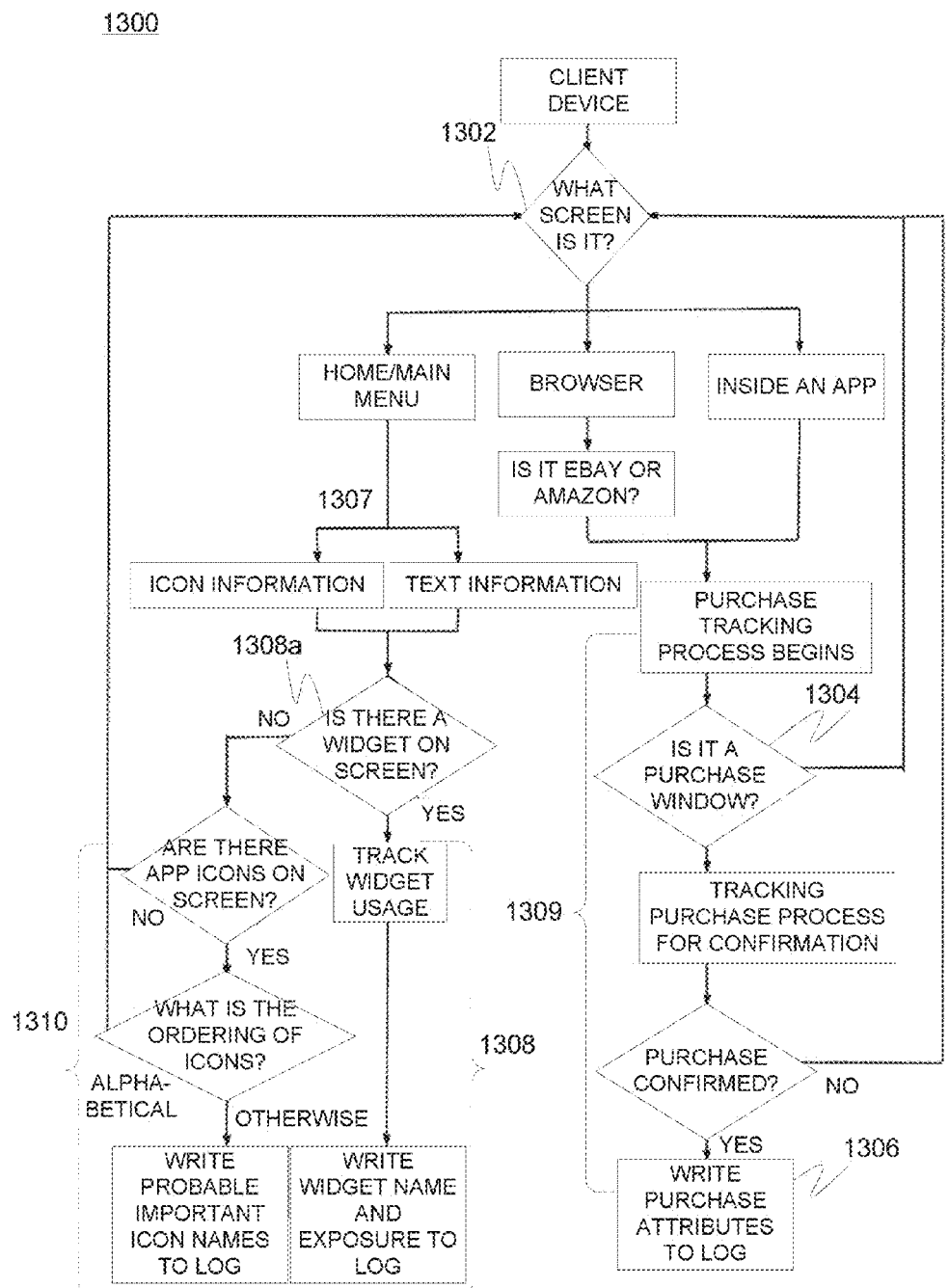
FIG. 13 illustrates an embodiment of the application of the provided framework.

Generally, the flow diagram in FIG. 13 discloses a method for tracking purchases, widget-usage patterns and icon preferences of the user. The process begins by detecting the so-called 'key-points' in an image screenshot. A key-point is essentially an important region in an image. Once these regions have been detected, an algorithm segments each region into a text part and a graphics part (if present) 1307. The text part may be deciphered using optical character recognition, while the graphics part (which could probably be or comprise an icon) is matched with a repository of icons.

The information about the text and the icon/graphics is used to determine whether a widget is present in the screenshot 1308a. Data on different widgets may be applied here and compared with the findings in addition or instead of utilizing other decision-making criteria. If present, then amount of time which the user has spent on the widget (or his engagement with the widget) may be logged.

If a widget is absent, interesting information regarding the user's preferences can still be logged 1310. To elaborate, smart phone menus have app icons which are ordered alphabetically, by user preference or in terms of the amount of usage. It is possible to check the order(ing) of the app icons, and if it is not an alphabetical one, then it can be fairly assumed that the ordering conforms to the user's preferences for particular apps rather well. In this case, we know which apps are popular with the user/which apps the user prefers.

The framework may be optimized in terms of performance when e.g. battery life of the client device executing screen capturing may be an issue. To elaborate, the framework proceeds such that a screenshot is taken from a client device and is then processed. The processing is possible both on the device and on a server, to which the image may be sent from the client device, using the client's network, typically Internet connectivity. Each of these possibilities has its own advantages and disadvantages. Processing on the device means exploiting the device's memory for calculations, and although the used algorithms have been optimized to exert minimal stress on the device memory, it may be still be draining on the battery. On the contrary, processing on the server is fast and flexible, where many advanced algorithms may be harnessed to analyze screen-capture images; however, it may require excessive transmission of images to the server, which would be draining on the internet bandwidth of the user (device), for example.

Figure 14:
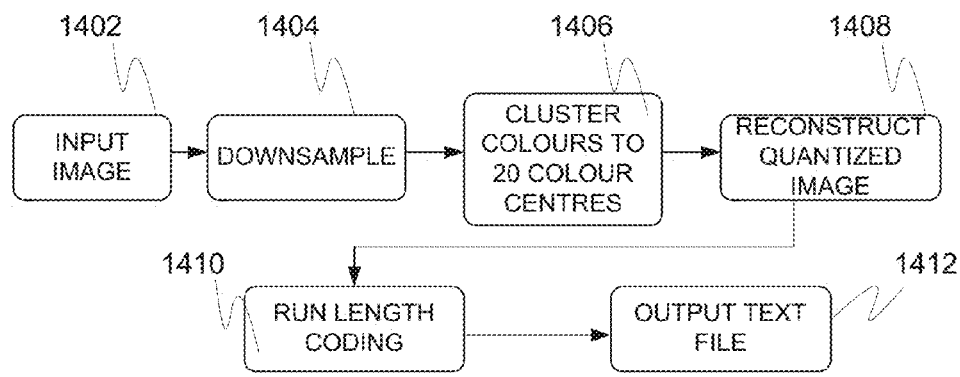
FIG. 14 is a flow diagram of an embodiment of a method for compressing and transferring indications of screen captured images (screenshot images) to a remote entity such as a server.

Intermediate solution could be achieved by sending compressed and encoded forms of screen-capture images to the server from the client device. The algorithm implemented here may bear e.g. the features depicted in FIG. 14.

The processing/analysis may begin by downsampling larger input images 1402 to fraction, e.g. half, of their original size. This step 1404 is carefully experimented to preserve valuable information. Since the incoming screen capture images 1402 may be quite large in resolution (e.g. about 1920×1200 for smartphones and 1200×1920 for tablets), reasonable downsampling still maintains most of the useful information somewhat intact. For screenshots initially having low resolution according to the utilized criteria, this step may be avoided.

Figure 15:
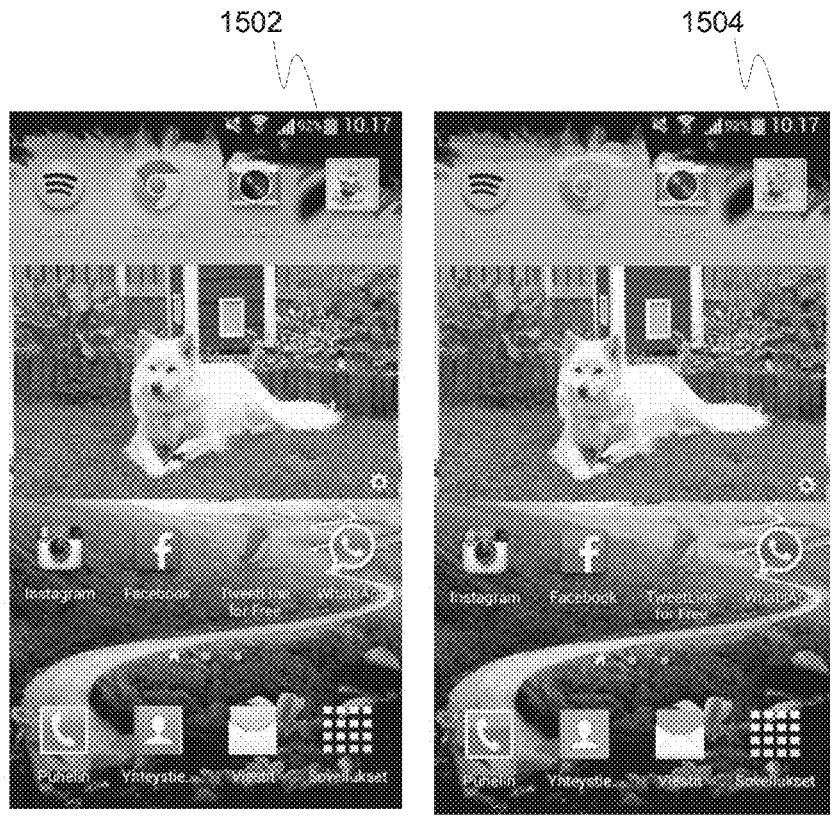
FIG. 15 shows two a screenshot image and its reconstruction based on compressing and encoding the original image for reduced memory and data transfer resources consumption.

Next, the images are quantized 1406 so that the possible $256^3$ colours are now represented by a greatly reduced number of colour centres, e.g. 20 colour centres. Too few colour centres and the images will suffer from false contouring, too large and the clustering algorithm will take too much time to converge. Experimentally, 20 centres were found to be satisfactory compromise for many uses. An example of the processing outcome is shown in FIG. 15, wherein the on the left, the original screen capture image 1402 is presented while the reconstruction 1504 is on the right. The important contours are still intact for the reduced number of colour centres in the reconstruction 1504.

Once quantized, reconstructed image has been obtained 1408, it may be subjected to encoding such as Run-length Encoding 1410 (RLE) and stored e.g. as a (text) file 1412.

Accordingly, screen capture images may be sent from the digital client/user devices to remote entities such as servers using only fraction of the bandwidth originally required. Similarly, storage (memory) capacity requirements are lowered, while the information extraction capabilities of our framework are not forfeited.

Figure 16:
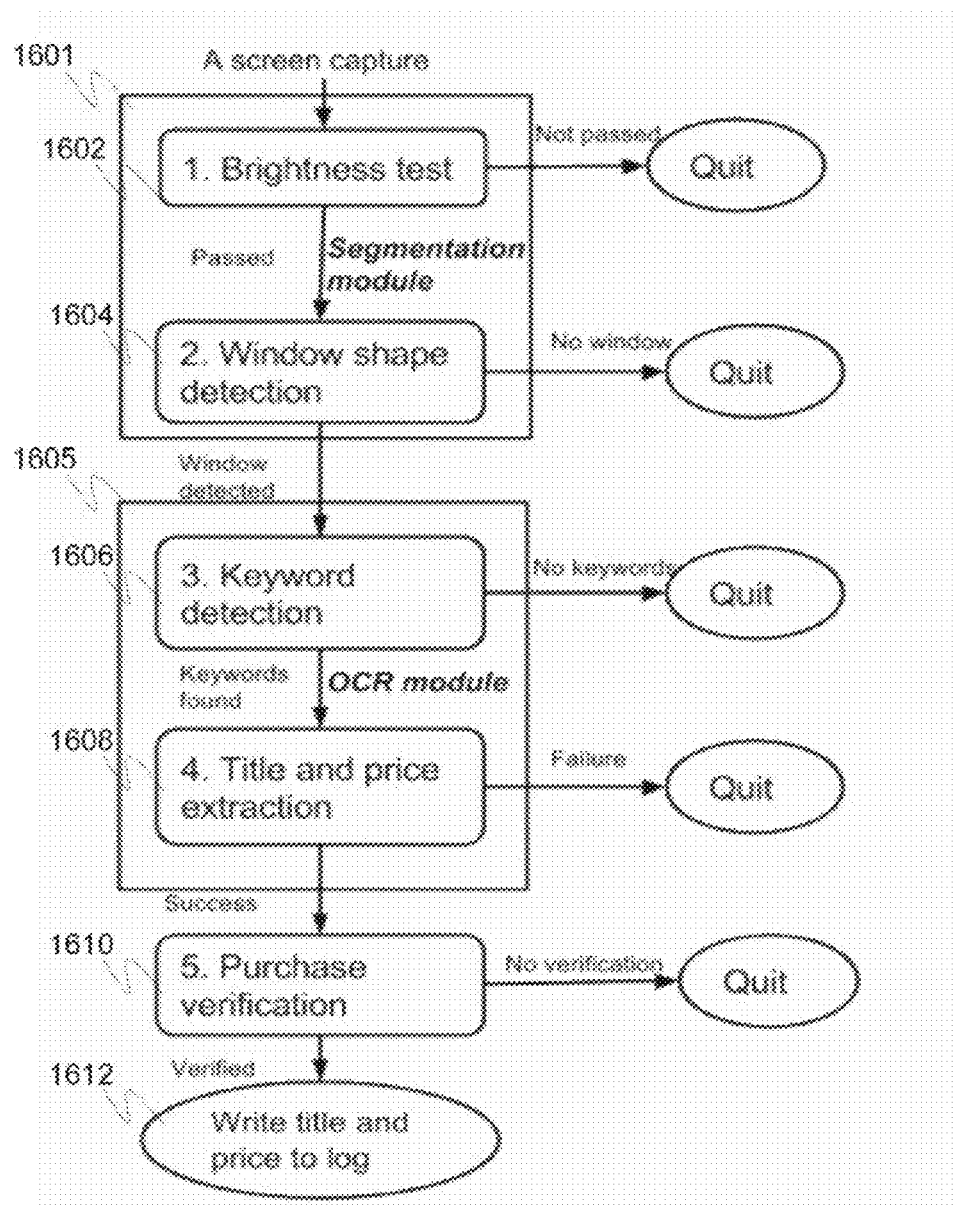
FIG. 16 illustrates an embodiment of purchase tracking

Switching over to a more detailed example concerning purchase tracking 1309, a reference is made to FIG. 16 disclosing one feasible embodiment 1600 for the task.

The figure describes how a specifically built background-running measurement software, potentially in combination of dynamic use of local and server-side data processing capabilities, is arranged to recognize, scrape and interpret mobile and online payment transactions, including the time of purchase, the context of purchase, amount of money involved in the purchase, and the target of the purchase transaction.

From a tracking point-of-view, the payments on e.g. mobile applications can be divided into at least two categories: in-app purchases and non-standardized purchases. The in-app purchases are payments done in the application via the marketplace of the operating system that always generates a standardized event on the display, which can be detected with the same method regardless of the vendor.

The other purchases can be done, for example, through a website, in an application or even via SMS (short messages). These purchases do not usually generate standardized events on the display, but can still be detected and logged by using the knowledge about the appearances or keywords of the purchases with a specific vendor or purchases in general.

The payment tracking system may be designed to be executed when the metering application notices that an application or website which might involve making purchases is on the display. The system can also ask the metering application to shorten the time interval between screenshots when something suggesting that a purchase is being seen on the display in order not to miss any relevant events.

The event on a display generated by an in-app purchase may consist of or comprise e.g. a window of particular appearance on the center of the display including the name and the price of the product to be purchased and a button needed to be pressed in order to make the purchase. After pressing the button, depending on the operating system, a password may be asked and a text confirming the purchase may appear. If the button is not pressed, the transaction is cancelled and the window will disappear. The appearance of the window can vary between applications due to, for example, transparency of the window, and at least the contents of the display outside the window will vary.

The system detecting at least in-app purchases may incorporate e.g. the following two modules: segmentation module 1601 and OCR (Optical Character Recognition) module 1605. The objective of the first module, the segmentation module 1601, is to detect if there is a window associated with in-app purchases on the screen and determine its dimensions. If a window is detected, the second module, the OCR module 1605, shall confirm that the detected window is actually a purchase window and extract the name and price of the purchased product.

The purchase can be confirmed in a similar manner: first a window shape is to be detected and then keywords associated with a confirmation window are to be searched. The structure of the system therefore adopts:

Segmentation module: Brightness test 1602: the procedure starts with a sanity test to quickly determine if it is indeed possible that there is a window on the screen. The input for this part may include a screen capture and at least one output may be a truth value indicating whether there might be a purchase window or not.

Segmentation Module: Window shape detection 1604: this part detects if there actually is a window shape on the screen and determines its dimensions. The input includes a screen capture and the output includes two sets of points: the location and dimensions of the window in the first set and the location of a button containing a keyword in the second.

OCR: Keyword detection 1606: this part looks for keywords in the detected window shape and takes e.g. a sub-image containing only the button as an input and outputs a truth value indicating whether a keyword was found or not.

OCR: Title and price extraction 1608: here the title and the price of the product are extracted. The input may include a sub-image containing the purchase window and the output may comprise the title and the price of the product.

Purchase verification 1610 verifies that purchase has been completed by taking e.g. further screenshots through the program flow with focus on different keywords until it is determined whether the purchase has been completed or cancelled.

Regarding the segmentation module 1601, the brightness test 1602 may be implemented, for example, by comparing the average intensity value of an area in the center of the display and the average intensity value of the whole display to set thresholds, since these values seem to fall within a certain range when a window is present on the display. If the window is not transparent and there are no variations in appearance between different purchase windows, which is the case e.g. with the Android™ platform, just calculating the average intensity value of the center of the display will suffice.

The brightness test 1602 can also be used for saving energy: if calculating a statistic from only certain pixels is enough for a reliable brightness test, only those pixels can be converted to a format understandable to the system at first.

If the brightness test is then passed, rest of the screen capture can then be converted and processed.

Figure 17:
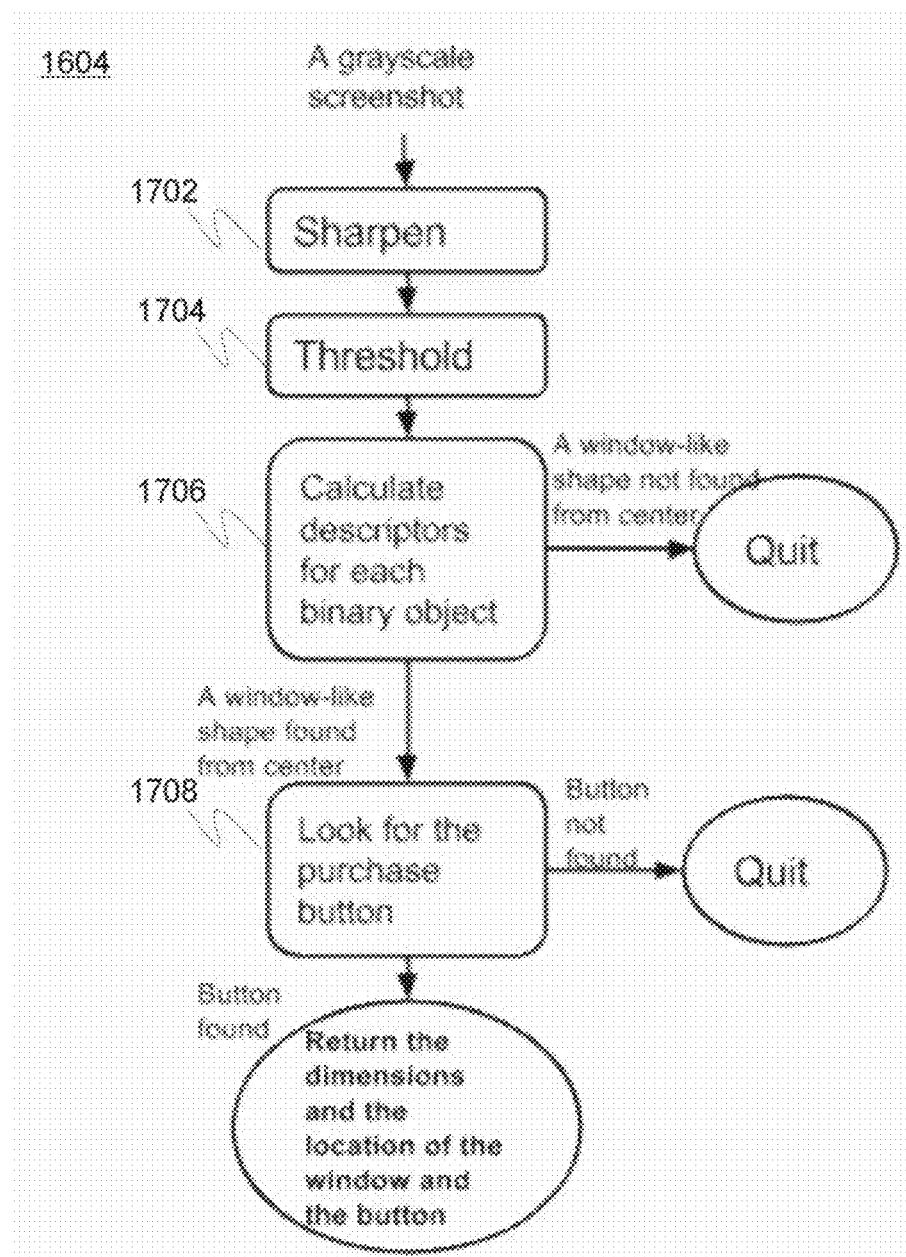
FIG. 17 illustrates an embodiment of window shape detection.

The window shape detection 1604 can be implemented in numerous ways, and one efficient method for detecting window shapes e.g. on iOS6™ is thresholding followed by connected component analysis, with reference to FIG. 17; before thresholding 1704, the screen capture is preferably sharpened 1702 with an unsharp mask in order to make the frame brighter and the pixels outside the frame darker. After thresholding 1704, in the screen capture with a high intensity value, the frame of the window remains in the binary image and is not attached to any other binary objects in areas outside the purchase window. Next, the boundaries of the binary objects are traced and one or more of the following descriptors calculated 1706 preferably for each object:

Rectangularity: the ratio of the area of the contour and the area of the bounding rectangle;

Elongatedness: the ratio of the lengths of the longer and the shorter vertex of the bounding rectangle;

Horizontal and vertical distances to the center of the screen.

These descriptors are then compared to set thresholds: Rectangularity must be above a predetermined threshold and elongatedness must be smaller than other predetermined threshold, for example. The window is usually located horizontally in the center of the screen, whereupon the horizontal distance to the screen center should be equal or less than predetermined limit Vertically, the distance should be less than certain percentage of the screen height, for instance. Also, the width of the bounding rectangle should be smaller than the width of the screen. If a shape fulfilling all or most of these conditions was found, the purchase button could be searched 1708 from the lower right area of the shape using e.g. Canny edge detection and connected component analysis similarly as mentioned above.

On the Android™ platform, one efficient way to detect the window shape implies using a form of region growing. Since the intensity of the background of the purchase window is usually high and almost uniform and the window is located at the center of the display, the window can be detected using the following method:

Starting from the center of the screen, pixels are traversed to left and right until the intensity changes by more than predefined limit (e.g. one). If the found intensity discontinuities are located in symmetrical positions, next the pixels above and below the pixels that are five or other desired number of pixels closer to the center are traversed until the intensity changes again. If the locations are again almost/substantially symmetrical and a button is found from within the window in previous methods, a window shape is detected.

Reverting to the OCR module 1605 in FIG. 16, and from the standpoint of both main stream operating systems of today's smart devices, namely Android™ and iOS™, a window shape detected by the window shape detection 1604 may be searched for a word indicating that the window shape is actually a purchase window 1606. This could be done by performing OCR within the region inside the button and matching the result with a keyword associated with the purchase transaction, for example "Buy" in English. The language of the operating system can be attached to the screen capture as a metadata, so that the correct keyword can be known. In some embodiments, the region is preferably thresholded with a high intensity value in order to suppress non-text pixels and highlight the text.

With some operating systems like the iOS™, the title and the price of the purchased product are sub-strings of a longer string in the window. For example, in English operating system the string may be of the form "Do you want to buy one N.N for X?" where N.N denotes the title and X the price. Thus the title can be extracted by searching for the first appearance of string "buy one" and the last appearance of string "for" and extracting the substring between these two substrings. The price can be extracted similarly from between the last appearances of "for" and "?".

With e.g. Android™, the title of the product can be found in the upper left area and the price in the upper right area of the window. Thus they can be simply extracted by performing OCR separately on these regions.

Regarding the purchase verification 1610 following the title and price extraction 1608, there may not be absolutely certain procedure to confirm that the purchase has been completed using just the contents of the screen, depending on the platform. If a user has enabled a setting where a password is asked before completing a purchase, something can be deduced if the following screen captures contain a window where a password is being asked. This window is quite similar in appearance to the purchase windows, except that it occupies the upper half of the screen whereas the lower half is reserved for a virtual keyboard. Thus the methods described earlier can be used for detecting this window. However, the purchase can be confirmed by observing if the user taps the area of the display containing the button.

However, e.g. in Android™ the purchase can be confirmed by using just the information on the screen. The user may have enabled again an option where a password is asked, but after that or even without that happening, a window containing a text indicating that the purchase has been completed will be on the screen. Additionally, before the confirmation window, an empty window containing only a small animation indicating processing of the purchase might be present. Since a virtual keyboard occupies the lower half of the screen when a password is being asked and no relevant information is present with the rest kind of windows associated with the purchase verification process, only the upper half of the screen is usually enough to be searched when verifying the purchase.

If the purchase has been verified, the following information may be written into a log 1612:

The name of the application,

The name of the product,

The price of the product,

Currency, and/or

Time and location.

Regarding the detection of non-standardized payments, detecting non-standardized payments may require using a library of objects and keywords associated with purchase events concerning specific vendors or in general. Given that the appearances of the purchase events might change over time and new vendors could emerge/old vendors disappear, the library must be configurable.

The library may incorporate different kinds of descriptors for the objects, or in some cases a template of the object itself to be used in template matching can be stored. The keywords can be stored separately or be linked with some object. For example, if some keyword should be found inside or near a specific shape, the keyword can be linked with the descriptors of the shape. Then if the shape is found, the presence of the keyword can be determined.

The acts performed by the user when doing non-standardized purchases e.g. via Internet shops usually follow a certain pattern: first the user browses through the collection of the vendor and adds the items to be purchased on a virtual shopping basket. When he/she is ready, he/she proceeds to checkout, where the contents of the basket are shown and it is asked if the user wants to continue with finalizing the purchase procedure. Then the user fills his/her contact and payment information and confirms the purchase, which is followed by a confirmation message from the vendor. The confirmation might also include a summary of the purchase, including the purchased products, their price and delivery address.

Taking the described pattern into account, tracking the purchases on Internet shops can, in a basic case, be performed by detecting when the user is seeing a summary of the purchase on the display. This can be done by detecting the specific objects and keywords associated with the specific event on display and then using OCR to extract text on the display, which contains the purchased products and their prices. Another way is to detect when the user is seeing the contents of the virtual shopping basket on the display and then examining what the user is seeing after that until the user sees a confirmation message or exits the website or closes the application.

Naturally some vendors have specialized purchasing environment where a purchase can be made with just a single click/command or where the purchase event is very different to what described earlier, so different approaches are necessary in some specific cases.

More information from consuming behavior of the user can be extracted by increasing the complexity of the system. It can be recognized and logged, for example, which products the user has eyed, which departments he has visited and which keywords he has used when searching the catalogue. Furthermore, it can be logged if the user has browsed competing Internet shops for similar products before placing the purchase. These additions require categorizing the products, which requires a separate reference library.

More information can be extracted by extending the whole screen capturing framework. For example, it can be determined if the user has seen an advertisement for the purchased product on some device or even in physical world if the exposure to physical world advertisements is tracked as well by using, for example, a camera of digital goggles or other wearable technologies. It could also be determined if the user has read about or seen the product in social or traditional electronic media or even in physical world.

Moving on to the field of content analysis not specifically targeted to purchase tracking, a feasible embodiment will be presented hereinbelow from the merely exemplary viewpoint of widget tracking 1308. The methods listed can be readily extended to describe the content of basically all kinds of images at present (phone, tablet screenshots, etc.) and likely in the future (e.g. Google Glass™ screenshots, for example), even though the thoroughly described example relates to widget-usage monitoring as the widgets cannot be duly tracked by traditional toolkits or methods in use at present.

"Widget" is a generic term for the part of a GUI (graphical user interface) that allows the user to interface with the application and operating system. Widgets display information and invite the user to act in a number of ways, thereby facilitating interaction. Widget usage tracking using e.g. Image Analysis enables estimation of time durations of widget usage client-wise.

Figure 18:
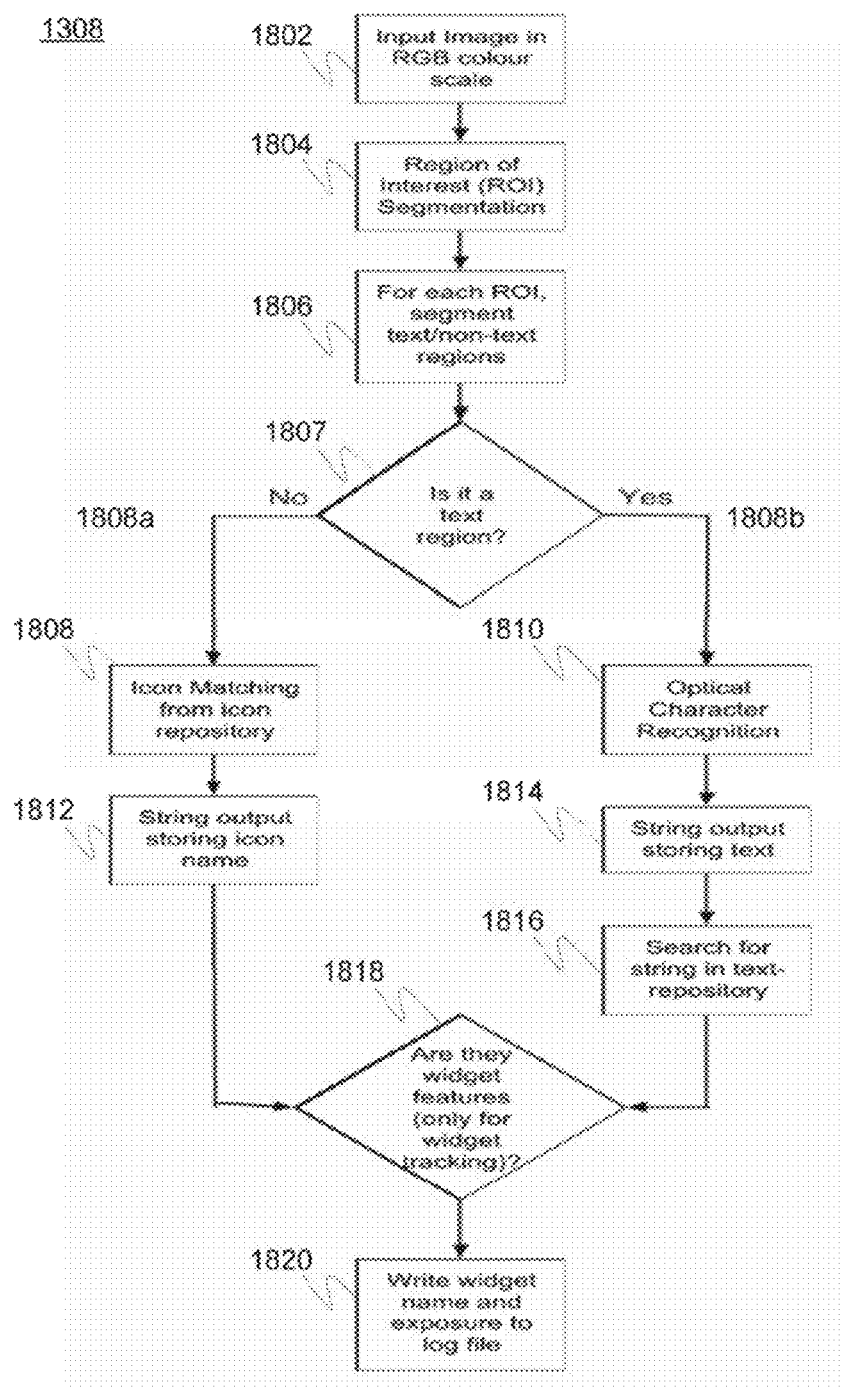
FIG. 18 shows an embodiment of content analysis relative to display view (or screenshot) features such as widgets.

The overview of the entire image content analysis process is presented in FIG. 18, which may be used to extract the features or "fingerprints", of any incoming input screenshot image, for subsequent matching with a library of features for recognition. When considering especially widget-identification and tracking, the steps may remain the same, except for the last step, where the extracted features are matched with a library of only widget-specific features.

The procedure for extracting features from screenshots contains a plurality of phases: (i) the segmentation of a taken screen-capture image 1802 into region of interests 1804, (ii) separating text-areas from non-text-areas 1806 for the speedup of the entire process (if necessary), (iii) optical character recognition (OCR) and string matching 1810, 1814, 1816, (iv) icon recognition 1808, 1812 and (v) content detection 1818 and logging 1820 (i.e., widget-identification in this particular example).

Note that for different types of tracking, all of the steps may practically remain the same except for the penultimate step.

Regarding the segmentation 1804 of possible regions of interest, in the computer vision paradigm, it is often assumed that the information contained in an image or a 'scene' is localized to a few 'interesting' areas, as opposed to the entire image. This gives rise to the dichotomy of 'background' and 'foreground'. A 'background' area is one which is uninteresting and a 'foreground' area is one which has useful information within it. Even in the case of screen capture analysis, this dichotomy may be considered to hold. For example, in a home/menu screen-capture image, the wallpaper may be termed as the background, whereas the icons, widgets and other graphics overlaid on it may form the information-rich foreground. Then, the task of separating the foreground from the background is a segmentation task, where the similarity between the background pixels and the various types of foreground pixels is modeled and then used to separate the two major groups.

Several methods exist for detecting these 'interesting' areas (or 'blobs', as they are called in Computer Vision), with each method having it's own set of advantages and disadvantages. A variety of them may be utilized in connection with the present invention, depending upon the task at hand. Certain preferred methods may include those of which perform edge detection and difference of Gaussians (DoG) on the screen-capture images. An example output of ROI segmentation is as follows:

Regarding text/non-text segmentation for optimization purposes, once the process described above is complete, we are left with only the important areas in the screen-capture image, or the regions of interest (ROIs). Each such ROI can contain information about an icon or graphics, text information, or both graphics and text information. As each such ROI may be passed into a different pipeline detecting either icons 1808a or text 1808b (via optical character recognition), it would be wasteful to pass each ROI through both the pipelines. Thus, for optimality, a text-area should not be generally passed into the icon detection framework and an area with an icon should not be passed through the optical character recognition (OCR) pipeline.

In order to follow the above principle, each ROI is first scanned for text information, which, if found, is separated from the parent ROI into its own ROI. Once this has been done 1804 for the ROIs, another algorithm may be configured to check 1806 if the separated ROIs correspond to text or graphics/icons. If graphics, it is sent for icon matching 1808a, else through the OCR route 1808b, which is indicated at 1807.

A block-based algorithm may be applied for separating text regions from non-text regions, which uses a combination of features known to describe text areas well. These features, namely delta-DCT (discrete cosine transformation) features, DCT-18, and variance features, can be calculated rapidly and they complement each other well. The algorithm works by dividing the image into small blocks and calculating the aforementioned features for each block. If the value of each of these features is above a certain threshold, then the block is classified as a text-block, else it is a non-text block. If a ROI is mostly composed of text, it is classified as a text-ROI.

Figure 19:
FIG. 19 illustrates an embodiment of image segmentation.

In FIG. 19, top row 1904 shows a number of original images, whereas the bottom row 1906 indicates text segmented areas thereat shown in white. The three original images are typical examples of regions with both graphics and text (Top-left), only graphics (Top-middle) and only text (Top-right).

The text areas may be passed to an optical character recognition (OCR) pipeline 1808b, which automatically segments the text into characters and recognizes each character. In order to perform fast detection and identification of text, very basic OCR 1810 can be performed, and hence it may suffer from the problem of being non-robust to noise, resolution and training fonts. Thus, some regions only get partially translated, and some have translations with wrong characters. In order to correct this, a string matching algorithm based on e.g. the Levenshtein distance or other selected string metric may be implemented 1816 for the OCR processed text 1814.

Detection is matched with a repository of keywords which are known to occur commonly in smart-devices, such as app names and common words. A match may be said to have occurred if e.g. the Levenshtein distance between the detection and a keyword in a repository is less than a threshold distance, which is based on the length of the original keyword.

Next the icon recognition 1808a is explained. The ROIs containing graphics/icons may be categorized into 'large' or 'small' areas by size, with the assumption that bigger areas probably incorporate more than one different graphic/icon, while a small region has only a single interesting icon/graphic. Each ROI is then passed through a feature description framework which extracts various types of features/characteristics, depending upon use. The extracted features are then matched with the features of icons from a repository, and closest matches are returned.

For a small area, it may be assumed that it only contains a single icon, and the closest match is returned, while for a large area, all the closest matches which satisfy a preset distance threshold are returned. The features used to perform such discrimination range from global features, for small areas, to local features to localize icons in big areas. Some features that are preferred include e.g. Gabor, LBP, BRISK and FREAK features.

Regarding content detection, it is the phase that is adapted with the specific task at hand. Once the icons and text present on the screen-capture image have been detected, the task is to infer the content present on the screen as indicated by the keywords retrieved from the screen capture by the image analysis system.

For the present case of specifically widget-detection, step essentially means matching the detected keywords with a library of keywords, each of which characterizes certain widgets. A greater number of matches convert into higher likelihood of a widget being accurately detected.

A widget can also be differentiated from a 'mere' icon, even if they relate to the same entity (e.g. Facebook™ icon vs. Facebook™ widget). A greater number of detections of keywords from the ROI may be translated into higher chances of the target being a widget and not an icon, since an icon would probably only have the name of the icon as the characteristic.

From the standpoint of further use cases, as smart goggles gain popularity and become more practical and usable all the time, it would be of real value apply the embodiments of the present invention in detecting user behavior and interaction with real-world content in connection with them. Artificial text or graphics overlaid on natural scenes, which the user might be viewing through his device, may be detected to gain understanding on the digital exposure of a user and how the user interacts with such smart, wearable, augmented-reality devices.

Figure 20:
FIG. 20 represents an augmented reality view shown e.g. via smart goggles, supplemented with indications of regions-of-interest (ROI) detected from the view by an embodiment of the present invention.

FIG. 20 shows an image captured from Google Glass™ provided with indications 2002 of ROI detection outcome thereon. The overlaid graphics and/or text may be thus detected on the natural scene image captured e.g. from the Google Glass™.

Going one step further and matching the detected graphics and text with a repository, the present invention could be configured to describe the context of the graphics or text on the screen. In the shown airport scenario, it could determine that it is a question of an application showing flight times e.g. due to the detection of the flight (plane) icon and relevant text (e.g. carrier, flight code, time data).

The aforementioned applications and implementation guidelines for the present invention are also applicable in tracking new types of digital devices. For example, reconstruction of the user's vision regarding external physical world allows for monitoring the exposure to outdoor advertising or recognizing automatically when the user sees e.g. a famous sight. While the previous case is particularly relevant for media research purposes, the latter could be rather beneficial in providing automated and passive augmented reality apps to the user.

The logic of observing the visual characteristics (e.g. screenshot of a screen of a smart device, generation of a log file describing the content of pop-ups and notification on a smart watch screen, or sampling camera still shots using attached wearable technologies like digital goggles) can be separate from the control of such observations (e.g. a central smart phone device in the user's pocket could control the digital goggles), and the required libraries of fingerprints or metadata databases can reside in the cloud or be stored locally as long as the information is made readily available to the processing logic described herein.

In the above, various embodiments of the present invention were discussed in detail. These embodiments were generally related to Internet devices, smart wireless devices, wearable devices or technologies, and other similar devices connected to wireless or wired communications networks, and showed how commonly available mobile and Internet devices can be harnessed to automatically and passively collect data on the context of the user and the exposure to either on-screen or external content, services, or advertising. The obtained information may also be combined with contextual data on the user attention, ambient light and sound and their interpretations, to generate e.g. derivative information for media research purposes or other uses based on the collected data, wherein that data may be integrated with data from other devices or data related to other people collected through a media research user panel, for instance. Ultimately, the cultivated data may be provided, through various applications, back to the user(s) or other recipients.

The present invention also encompasses a method to utilize ambient sound, eye ball tracking, or similar sensor (ing) technologies to validate the target of user attention and e.g. the time span of any part of the attention targeted to certain content, services, or external objects. The time of the attention may be calculated as a combination of the exposure to the event, object or content, and the validation of the attention focus among other potential factors.

The present invention is further able to incorporate audio and other similar data to better identify the context of the user (e.g. whether there are other people present) and in some cases validate more accurately the service the user is using, optionally pinpointing if a (wearable) device is running e.g. a navigation app and providing voice guidance, while the user's attention might be in fact targeted to the road, through visual pinpointing of the user attention. Generally, visual content may be enriched with data on audio signals or audio exposure as well as visual landscape reconstruction based on e.g. image recognition may be utilized for providing valuable audio output. The output may be related to the recognized visual data such as audio notifications regarding the same or other associated information the user may have interest in.

A skilled person will therefore appreciate the fact the scope is not limited to the explicitly disclosed embodiments but covers also numerous other realizations falling under the claim wordings.

The invention claimed is:

1. An electronic system for obtaining data on user behavior, digital transactions, and exposure relative to digital content and services, or on external exposure and associated events between the user and the environment, the system comprising:
   one or more digital devices, each having at least one of a digital screen and/or a sensor operably connected thereto, as well as a processor device and a memory for storing information readable by the processor device; and
   a server, operably connected to the one or more digital devices by way of communications network, the server comprising a processing apparatus in operable connection with a data storage device,
   the memory of the one or more digital devices and the data storage device of the server having software code stored therein that, upon execution by the processor device of the one or more digital devices and the processing apparatus of the server, causes the one or more digital devices and the server to operate as a system that
      collects data reflecting content and objects that the user at least potentially perceives as rendered on one or more digital screens attached to the one or more digital devices, through associated digital projections or characteristics specific to digital content or objects, or in the environment,
      reconstructs an at least potentially perceived visual landscape based on the collected data, and
      determines a target and/or level of user attention in view of the reconstructed visual landscape and associated exposure events detected therein,
   wherein the system is also configured, by way of said software code, to
      apply at least some locally stored information about rules or fingerprints in the digital object recognition process involving the collected data and validation of the type or identity of user actions, digital content, or external objects, as reflected by the reconstruction recapturing the potential visual landscape, and
      apply a user device-originating metadata database to conduct image recognition to reconstruct the visual landscapes, the database being formed or updated by said one or more digital devices being configured to identify new objects visible to the user on the screen or in the environment, and provide indications thereof to the metadata database for the purposes of classifying said object.

2. The system of claim 1, further configured to collect visual data through screen capturing.

3. The system of claim 1, further configured to adapt data sampling, or specifically screen capturing rate for collecting visual data, through utilization of difference imaging, wherein small differences between subsequently captures images turn into reduced rate and vice versa, to reduce processing and memory requirements as well as power consumption.

4. The system of claim 1, further configured to collect visual data through one or more cameras integrated or at least functionally connected with at least one of the one or more digital devices.

5. The system of claim 1, further configured to utilize said rules and fingerprints in the recognition and landscape reconstruction process regarding at least element selected from the group consisting of: icon, graphics, image, text string, app, service, payment, purchase, advertisement, menu item, menu indicator, and window element.

6. The system of claim 1, further configured to provide, as a feedback to the collected data on user behavior, transactions or exposure, a user of a digital device of the one or more digital devices with content, notifications, or other visual information the user has interest in based on the analysis of the data.

7. The system of claim 1, further configured to specifically collect information on the user's physical condition including the status and movement of eyes to recognize the visual attention, to validate that the user is awake and present in the situation and/or to validate the level of user attention in a given type of exposure.

8. The system of claim 1, further configured to enrich visual content with data on the detected audio exposure or signals.

9. The system of claim 1, further configured to specifically recognize, based on the collected and reconstructed visual data, one or more objects the user exposes to in the physical world, and the semantic meaning of such objects.

10. The system of claim 1, further configured to detect home screen or menu screen from the obtained visual screen capture data.

11. The system of claim 1, further configured to detect home screen or menu screen from the obtained visual screen capture data, and to recognize a home or menu screen based on detecting the outlook, number and/or positioning, of visual on-screen menu elements as defined by the fingerprints from the visual data.

12. The system of claim 1, further configured to compress the obtained screen capture data by run-length encoding, reducing the image resolution and/or color quantization.

13. The system of claim 1, further configured to track and log exposure to predefined visual content, such as a widget, based on extracting and recognizing content-associated graphical or textual information from the obtained visual screen data through utilization of icon matching and optical character recognition.

14. The system of claim 1, further configured to determine entity, such as application, user preference or usage ranking based on detecting the on-screen order of entity-associated icons or other graphical representations.

15. The system of claim 1, further configured to subject the obtained visual data to region of interest segmentation to separate different areas, such as foreground and background areas, from each other.

16. The system of claim 1, further configured to subject the obtained visual data to text and non-text separation.

17. The system of claim 1, further configured to recognize a payment or purchase transaction based on transaction window detection, transaction symbol such as purchase button or icon detection, and/or OCR-based transaction text detection.

18. The system of claim 1, further configured to maintain one or more logs of recognized exposure events, user attention, and/or transactions in said one of more digital devices and/or in a functionally connected remote server arrangement of at least one server.

19. The system of claim 1, wherein said one or more digital devices obtain and analyze visual data.

20. The system of claim 1, the server configured to receive collected and data at least indicative of said visual data from said one or more digital devices, process the data, store the data, and distribute the data and/or provide responsive data back to the one or more digital devices.

21. A method for obtaining data, via one or more digital devices, on user behavior, digital transactions, and exposure relative to digital content and services, or on external exposure and associated events between the user and the environment through the use of a number of sensors, comprising:

collecting data reflecting the content and objects that the user at least potentially perceives as rendered on one or more digital screens attached to the one or more digital devices, through associated digital projections or characteristics specific to digital content or objects, or in the environment;

reconstructing the at least potentially perceived visual landscape based on the collected data; and determining the target and/or level of user attention in view of the reconstruction and associated exposure events detected therein, wherein information stored locally at said one or more digital devices about rules or fingerprints is applied in the digital object recognition process involving the collected data and validation of the type or identity of user actions, digital content, or external objects, as reflected by the reconstruction recapturing the visual landscape, and wherein user device-originating metadata database for conducting image recognition is applied to reconstruct the visual landscapes, said metadata database being formed or updated by said one or more digital devices configured to identify new objects visible to the user on the screen or in the environment, and provide indications thereof to the metadata database for classifying said object.

22. A computer program product embodied on a non-transitory carrier medium comprising instructions causing the computer to:

collect data reflecting the content and objects that the user at least potentially perceives as rendered on one or more digital screens attached to one or more smart devices, through associated digital projections or characteristics specific to digital content or objects, or in the environment, reconstruct the at least potentially perceived visual landscape based on the collected data, determine the target and/or level of user attention in view of the reconstruction and associated exposure events detected therein, wherein information stored locally at said one or more smart devices about rules or fingerprints is applied in the digital object recognition process involving the collected data and validation of the type or identity of user actions, digital content, or external objects, as reflected by the reconstruction recapturing the visual landscape, and apply user device-originating metadata database for conducting image recognition to reconstruct the visual landscapes, wherein the metadata database is formed or updated by said one or more smart devices configured to identify new objects visible to the user on the screen or in the environment, and provide indications thereof to the metadata database for the purposes of classifying the said object.

* * * * *